US012750616B2

(12) United States Patent
Wang et al.

(10) Patent No.: US 12,750,616 B2
(45) Date of Patent: Sep. 29, 2026

(54) ACOUSTIC OUTPUT DEVICES

(71) Applicant: SHENZHEN SHOKZ CO., LTD., Shenzhen (CN)

(72) Inventors: Zhen Wang, Shenzhen (CN); Jianing Liang, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 36 days.

(21) Appl. No.: 18/499,204

(22) Filed: Oct. 31, 2023

(65) Prior Publication Data

US 2024/0323592 A1 Sep. 26, 2024

Related U.S. Application Data

(63) Continuation of application No. PCT/CN2023/100535, filed on Jun. 15, 2023.

(30) Foreign Application Priority Data

Mar. 24, 2023 (WO) ................ PCT/CN2023/083553
Mar. 24, 2023 (WO) ................ PCT/CN2023/083554

(51) Int. Cl.

*H04R 1/28* (2006.01)
*H04R 1/10* (2006.01)
*H04R 1/34* (2006.01)

(52) U.S. Cl.

CPC ......... *H04R 1/2853* (2013.01); *H04R 1/1008* (2013.01); *H04R 1/34* (2013.01)

(58) Field of Classification Search

CPC ...... H04R 1/2853; H04R 1/1008; H04R 1/34; H04R 1/02; H04R 1/2803; H04R 1/2819;

(Continued)

(56) References Cited

U.S. PATENT DOCUMENTS 5,109,416 A 4/1992 Croft
7,499,555 B1 3/2009 Isvan (Continued)

FOREIGN PATENT DOCUMENTS

CN 105227719 A 1/2016
CN 111343552 A 6/2020

(Continued)

OTHER PUBLICATIONS

The Extended European Search Report in European Application No. 25159292.9 mailed on Jun. 17, 2025, 11 pages.

(Continued)

*Primary Examiner* — Ahmad F. Matar
*Assistant Examiner* — Sabrina Diaz
(74) *Attorney, Agent, or Firm* — METIS IP LLC

(57) ABSTRACT

The present disclosure provides an acoustic output device including an acoustic driver, and a first cavity and a second cavity acoustically coupled to the acoustic driver. The first cavity and the second cavity are provided with a first acoustic hole and a second acoustic hole, respectively, from which the acoustic driver radiate sounds with a phase difference to an outside environment. Within a target frequency band, a near-field sound radiated from the first acoustic hole and a near-field sound radiated from the second acoustic hole may have a near-field sound pressure level difference of less than 6 dB, and the sound radiated by the acoustic output device to a far-field has directivity, which is manifested in that the sounds radiated from the two acoustic holes have a far-field sound pressure level difference of not less than 3 dB in at least one pair of opposite directions.

19 Claims, 16 Drawing Sheets

(58) Field of Classification Search
CPC .. H04R 1/2842; H04R 1/2811; H04R 1/2834; H04R 5/033; H04R 2499/11; H04R 2499/15; H04S 1/005
USPC .......................................... 381/309, 345, 351
See application file for complete search history.

(56) References Cited

U.S. PATENT DOCUMENTS

| | | | |
|---|---|---|---|
| 9,784,676 | B2 | 10/2017 | Shetye et al. |
| 2013/0343593 | A1 | 12/2013 | Howes et al. |
| 2017/0201823 | A1 | 7/2017 | Shetye et al. |
| 2018/0048960 | A1* | 2/2018 | Jeffery .................. H04R 1/403 |
| 2019/0020940 | A1 | 1/2019 | Silver et al. |
| 2021/0058693 | A1 | 2/2021 | Woelfl |
| 2021/0067857 | A1 | 3/2021 | Struzik |
| 2021/0112329 | A1 | 4/2021 | Zhang et al. |
| 2021/0219068 | A1 | 7/2021 | Zhang et al. |
| 2022/0124423 | A1 | 4/2022 | Zheng et al. |
| 2022/0159366 | A1 | 5/2022 | Porter |
| 2023/0111069 | A1 | 4/2023 | Wang et al. |
| 2024/0064477 | A1 | 2/2024 | Sunohara et al. |
| 2024/0147139 | A1 | 5/2024 | Chen et al. |
| 2024/0357280 | A1* | 10/2024 | Corynen .............. H04R 1/2803 |
| 2024/0406618 | A1 | 12/2024 | Wang et al. |
| 2025/0016487 | A1 | 1/2025 | Zhang et al. |

FOREIGN PATENT DOCUMENTS

| | | | |
|---|---|---|---|
| CN | 212064357 | U | 12/2020 |
| CN | 112929769 | A | 6/2021 |
| CN | 113316061 | A | 8/2021 |
| CN | 114286243 | A | 4/2022 |
| CN | 216700057 | U | 6/2022 |
| CN | 217643682 | U | 10/2022 |
| CN | 115550783 | A | 12/2022 |
| EP | 4009665 | A1 | 6/2022 |
| KR | 102347626 | B1 | 1/2022 |
| KR | 20230007534 | A | 1/2023 |
| WO | 2019192816 | A1 | 10/2019 |
| WO | 2023030847 | A1 | 3/2023 |

OTHER PUBLICATIONS

The Extended European Search Report in European Application No. 23929034.9 mailed on Jul. 29, 2025, 10 pages.
The Extended European Search Report in European Application No. 23929035.6 mailed on Sep. 16, 2025, 15 pages.
Notice of Preliminary Rejection in Korean Application No. 10-2025-7003255 mailed on Dec. 22, 2025, 12 pages.
Notice of Reasons for Rejection in Japanese Application No. 2025508495 mailed on Jan. 20, 2026, 10 pages.

* cited by examiner

ACOUSTIC OUTPUT DEVICES

CROSS-REFERENCE TO RELATED APPLICATIONS

This application is a continuation of International Patent Application No. PCT/CN2023/100535, filed on Jun. 15, 2023, which claims priority of International Patent Application No. PCT/CN2023/083553, filed on Mar. 24, 2023, and International Patent Application No. PCT/CN2023/083554, filled on Mar. 24, 2023, the contents of each of which are entirely incorporated herein by reference.

TECHNICAL FIELD

The present disclosure relates to the field of acoustics, and specifically, to an acoustic output device.

BACKGROUND

In the process of outputting sound, an acoustic output device radiates most of sound waves toward a user's ear canal opening, but inevitably, some sound waves are radiated toward other directions (e.g., away from the ear canal opening), resulting in a certain degree of sound leakage from the acoustic output device. Therefore, it is of great significance to have directional propagation of sound waves in order to reduce sound leakage in acoustic output devices. Existing acoustic output devices typically use a dipole formed by two sound sources with equal amplitudes and opposite phases to create a directional radiating sound field, thereby achieving directional sound propagation. However, in this manner, while achieving sound wave propagation in a specific direction, a relatively high sound field intensity is also formed in an opposite direction to the specific direction. This means that significant sound leakage may still be heard when someone is located directly in front of or to a side of a listener.

Therefore, it is necessary to design an acoustic output device that maximizes the volume in the direction of the listener's ear canal opening while minimizing sound leakage in other directions, thereby achieving better privacy in sound listening.

SUMMARY

One of the embodiments of the present disclosure provides an acoustic output device, including: at least one acoustic driver; and a first cavity and a second cavity acoustically coupled to the at least one acoustic driver, the first cavity being provided with a first acoustic hole, the second cavity being provided with a second acoustic hole, and the at least one acoustic driver radiating sounds with a phase difference to an outside environment through the first acoustic hole and the second acoustic hole. Within a target frequency band, a near-field sound radiated from the first acoustic hole and a near-field sound radiated from the second acoustic hole have a near-field sound pressure level difference, the near-field sound pressure level difference being less than 6 dB; and within the target frequency band, the sound radiated by the acoustic output device to a far-field has directivity, which is manifested in that the sounds radiated from the first acoustic hole and the second acoustic hole have a far-field sound pressure level difference of not less than 3 dB in at least one pair of opposite directions.

In some embodiments, the target frequency band may be 200 Hz-5000 Hz.

In some embodiments, the near-field sound pressure level difference may be less than 3 dB, and/or, the far-field sound pressure level difference may be not less than 6 dB.

In some embodiments, in a frequency range of 1 kHz-8 kHz, a change rate of the phase difference may be less than 30°/oct.

In some embodiments, in a frequency range of 1 kHz-8 kHz, a change rate of the phase difference may be less than 20°/oct.

In some embodiments, an absolute value of a difference between the phase differences of the near-field sound radiated from the first acoustic hole and the near-field sound radiated from the second acoustic hole at 1 kHz and the phase difference of the near-field sound radiated from the first acoustic hole and the near-field sound radiated from the second acoustic hole at 2 kHz may be less than 30°.

In some embodiments, the target frequency band may include target frequencies of 500 Hz, 1 kHz, 2 kHz, and 4 kHz.

In some embodiments, a ratio of an area of the first acoustic hole to an area of the second acoustic hole may be in a range of 0.5-2.

In some embodiments, the ratio of the area of the first acoustic hole to the area of the second acoustic hole may be in a range of 0.8-1.25.

In some embodiments, a difference between acoustic loads of the first acoustic hole and the second acoustic hole may be less than 0.15.

In some embodiments, the difference between the acoustic loads of the first acoustic hole and the second acoustic hole may be less than 0.1.

In some embodiments, a ratio of surface acoustic loads of the first acoustic hole and the second acoustic hole may be in a range of 0.5-3.5.

In some embodiments, the ratio of the surface acoustic loads of the first acoustic hole and the second acoustic hole is in a range of 0.8-2.

In some embodiments, the at least one acoustic driver may have a front side and a rear side defined by a diaphragm, the at least one acoustic driver may radiate the sounds to the first cavity and the second cavity through the front side and the rear side respectively.

In one or more embodiments of the present disclosure, the at least one acoustic driver may include two acoustic drivers, the two acoustic drivers radiating the sounds to the first cavity and the second cavity respectively.

In some embodiments, the acoustic output device may further include: a support structure configured to hang on a head or an upper torso of a user and configured to place the acoustic output device at a position on an ear of the user without blocking an ear canal.

One of the embodiments of the present disclosure provides an acoustic output device, the device may include: at least one acoustic driver; a first cavity and a second cavity acoustically coupled to the at least one acoustic driver, the first cavity being provided with a first acoustic hole, the second cavity being provided with a second acoustic hole, and the at least one acoustic driver radiating sounds with a phase difference to an outside environment through the first acoustic hole and the second acoustic hole. Within a target frequency band, the sound radiated by the acoustic output device to a far-field may have directivity, which is manifested in that the sounds radiated from the first acoustic hole and the second acoustic hole have a far-field sound pressure level difference of not less than 3 dB in at least one pair of opposite directions, and a difference between acoustic loads of the first acoustic hole and the second acoustic hole may be less than 0.15.

One of the embodiments of the present disclosure provides an acoustic output device, the device may include: at least one acoustic driver; a first cavity and a first cavity and a second cavity acoustically coupled to the at least one acoustic driver, the first cavity being provided with a first acoustic hole, the second cavity being provided with a second acoustic hole, and the at least one acoustic driver radiating sounds with a phase difference to an outside environment through the first acoustic hole and the second acoustic hole. Within a target frequency band, the sound radiated by the acoustic output device to a far-field may have directivity, which is manifested in that the sounds radiated from the first acoustic hole and the second acoustic hole have a far-field sound pressure level difference of not less than 3 dB in at least one pair of opposite directions. A ratio of surface acoustic loads of the first acoustic hole and the second acoustic hole may be in a range of 0.5-3.5.

One of the embodiments of the present disclosure provides an acoustic output device, the device may include: at least one acoustic driver; a first cavity and a second cavity acoustically coupled to the at least one acoustic driver, the first cavity being provided with a first acoustic hole, the second cavity being provided with a second acoustic hole, and the at least one acoustic driver radiating sounds with a phase difference to an outside environment through the first acoustic hole and the second acoustic hole, within a range of 1 kHz-8 kHz, a change rate of the phase difference being less than 30°/oct. Within the target frequency band, the sound radiated by the acoustic output device to a far-field may have directivity, which is manifested in that the sounds radiated from the first acoustic hole and the second acoustic hole may have a far-field sound pressure level difference of not less than 3 dB in at least one pair of opposite directions.

One of the embodiments of the present disclosure may provide an acoustic output device including: at least one acoustic driver; a first cavity and a second cavity acoustically coupled to the at least one acoustic driver, the first cavity being provided with a first acoustic hole, the second cavity being provided with a second acoustic hole, and the at least one acoustic driver radiating sounds with a phase difference to an outside environment through the first acoustic hole and the second acoustic hole. The target frequency band, the sound radiated by the acoustic output device to a far-field has directivity, which is manifested in that the sounds radiated from the first acoustic hole and the second acoustic hole may have a far-field sound pressure level difference of not less than 3 dB in at least one pair of opposite directions, a ratio of areas of the first acoustic hole and the second acoustic hole may be in a range of 0.5-2.

BRIEF DESCRIPTION OF THE DRAWINGS

The present disclosure will be further illustrated by way of exemplary embodiments, which will be described in detail with the accompanying drawings. These embodiments are not restrictive, and in these embodiments, a same number may indicate a same structure, wherein.

DETAILED DESCRIPTION

Figure 1:
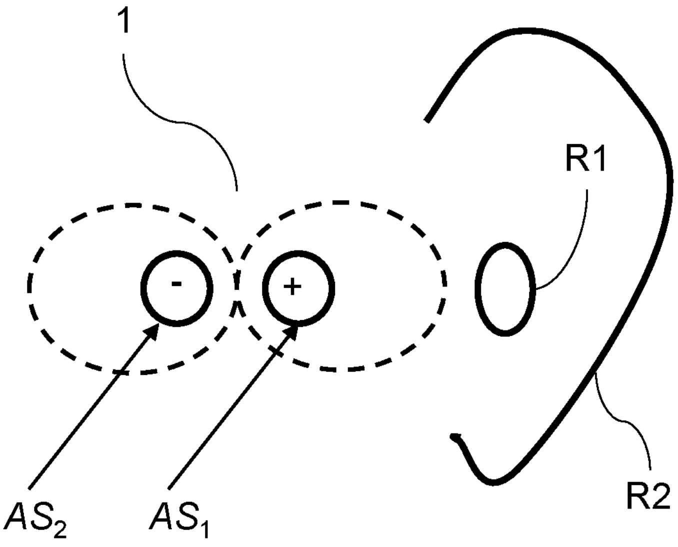
FIG. 1 is a structural diagram illustrating an exemplary directional radiating sound field of an acoustic output device according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios based on the accompanying drawings without creative labor. Unless obviously obtained from the context or the context illustrates otherwise, the same numeral in the drawings refers to the same structure or operation.

It should be understood that the "system," "device," "unit," and/or "module" used herein are one mode to distinguish different components, elements, parts, sections, or assemblies of different levels. It should be understood that the preceding or following operations are not necessarily performed in the exact order.

As used in the disclosure and the appended claims, the singular forms "a," "an," and "the" include plural referents unless the content clearly dictates otherwise; the plural forms may be intended to include singular forms as well. At the same time, other operations may be added to these processes, or a certain operation or operations may be removed from these processes.

Flowcharts are used to illustrate the operations performed by the system of the embodiments of the present disclosure. It should be noted that preceding or following operations are not necessarily performed in exact order. Instead, the operations may be processed in reverse order or simultaneously. At the same time, other operations may be added to these processes, or one or more operations may be removed from these processes.

FIG. 1 is a structural diagram illustrating an exemplary directional radiating sound field of an acoustic output device according to some embodiments of the present disclosure.

The acoustic output device may emit a sound near a listener's ear, resulting in the sound being radiated into a surrounding environment, thereby leading to significant sound leakage from the acoustic output device. In order to reduce the sound leakage of the acoustic output device, so that more sound can be transmitted to an ear canal opening of the listener, in some embodiments, the acoustic output device may utilize two sound sources (e.g., a first sound source AS1 and a second sound source AS2 shown in FIG. 1) of equal amplitudes and opposite phases to form a dipole 1. The dipole 1 may form a directional radiating sound field resembling a figure "8" pattern, as shown in FIG. 1. The figure "8" directional radiating sound field may include two directions with very strong radiation, and it may also be understood that the figure "8" directional radiating sound field has two main lobes. In order to improve the listening effect of the listener, the sound propagated by the acoustic output device toward the ear canal opening of the listener may be made great enough by adjusting positions of the two sound sources so that one main lobe points toward the ear canal opening of the listener. Meanwhile, according to the schematic diagram of the directional radiating sound field of the dipole 1 in FIG. 1, when one main lobe points toward the listener's ear canal opening R1, another main lobe usually points towards the front or side of the listener. This also means that when other individuals are positioned in front or to a side of the listener, they may also be able to clearly hear the sound leakage from the acoustic output device.

Since a cancellation degree of the sound output by the acoustic output device in the far-field can be changed by adjusting a phase of the sound output by the acoustic output device, in order to further reduce the sound leakage of the acoustic output device, embodiments of the present disclosure provide an acoustic output device that radiates sounds with a phase difference to the outside environment. The acoustic output device may include at least one acoustic driver, and a first cavity and a second cavity coupled to the at least one acoustic driver. A first acoustic hole is coupled with the first cavity and a second acoustic hole is coupled with the second cavity. The at least one acoustic driver may radiate the sounds with the phase difference to the outside environment through the first acoustic hole and the second acoustic hole. When the phase difference satisfies a certain condition, it can maintain a great volume output by the acoustic output device in a certain direction (e.g., a direction in which the ear canal of the user is located) while suppressing the sound leakage output by the acoustic output device in the opposite direction. In some embodiments, the phase difference may be in a range of 120°-179°. In some embodiments, the phase difference may be in a range of 90°-179°.

In some embodiments, by regulating the phase difference between two sounds generated by the acoustic output device, it is possible to make, in a target frequency band, a near-field sound radiated from the first acoustic hole and a near-field sound radiated from the second acoustic hole to have a near-field sound pressure level difference of less than 6 dB. In the target frequency band, the sound radiated to the far-field by the acoustic output device may have directivity (the directivity may be manifested as the sounds radiated from the first acoustic hole and the second acoustic hole having a far-field sound pressure level difference of not less than 3 dB in at least a pair of opposite directions). In this way, the volume of sound may be greater in the direction towards the ear canal opening R1 of the listener, and the sound leakage in the direction opposite to the direction towards the ear canal opening R1 of the listener may be smaller, thereby ensuring a balance between ear canal openness and listening privacy.

Figure 2A:
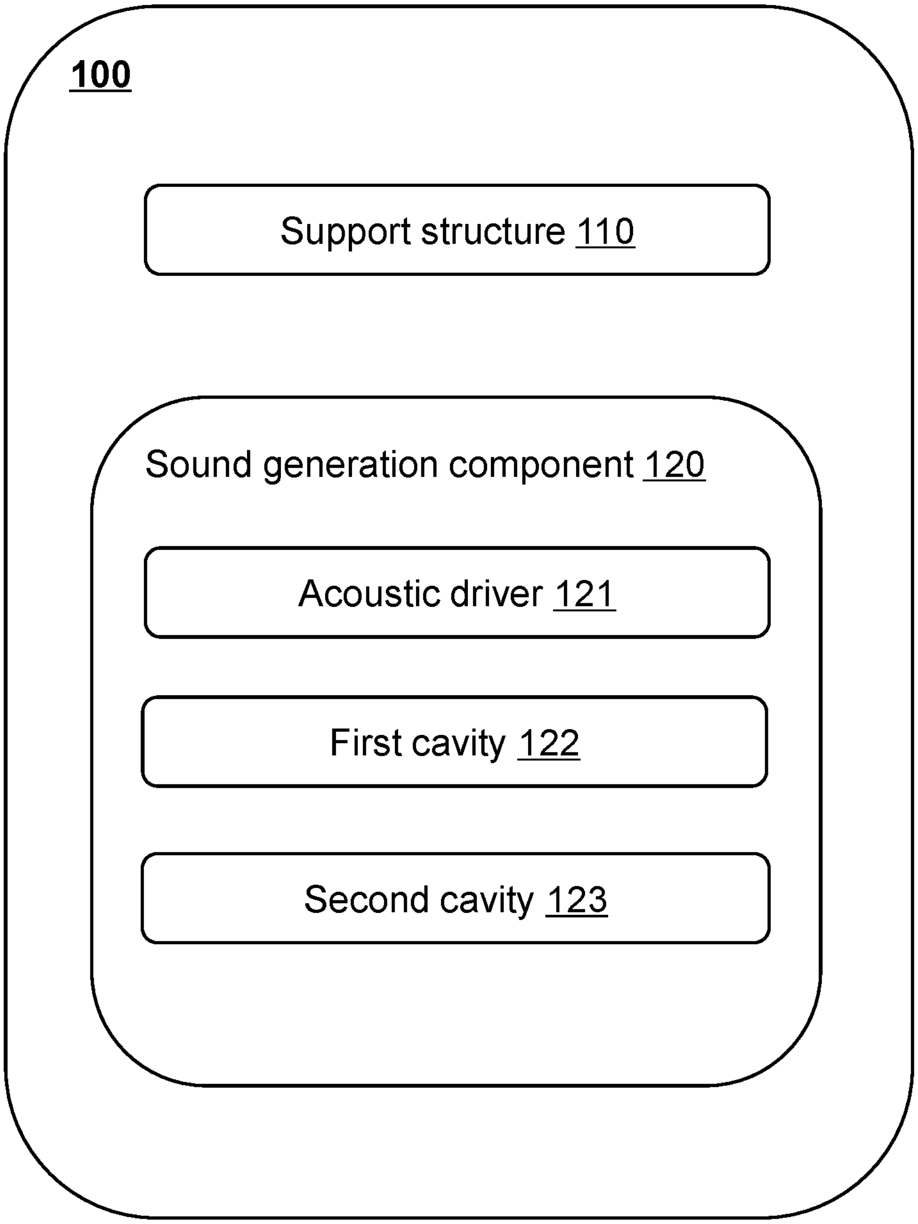
FIG. 2A is a block diagram illustrating a structure of an exemplary acoustic output device according to some embodiments of the present disclosure.

FIG. 2A is a block diagram illustrating a structure of an exemplary acoustic output device according to some embodiments of the present disclosure.

In some embodiments, the acoustic output device may include at least one acoustic driver. As shown in FIG. 2A, an acoustic output device 100 may include an acoustic driver 121, a first cavity 122, and a second cavity 123. The first cavity 122 and the second cavity 123 may be acoustically coupled to the acoustic driver 121, respectively. In some embodiments, a first acoustic hole may be provided at a location of the first cavity 122 of the acoustic output device 100, and the acoustic driver 121 may radiate a sound (also referred to as a first sound) outward from the first acoustic hole through the first cavity 122. A second acoustic hole may be provided at a location of the second cavity 123 of the acoustic output device 100, and the acoustic driver 121 may radiate a sound (also referred to as a second sound) outward from the first acoustic hole through the first cavity 122.

The acoustic driver 121 refers to a device that is capable of converting an electrical signal into a sound signal and outputting the sound signal. Exemplarily, the acoustic driver 121 may have a diaphragm, and a driving component (e.g., a coil and a magnetic circuit assembly) capable of driving the diaphragm to vibrate. In some embodiments, there may be one acoustic driver 121. At this point, the acoustic driver 121 may have a front side and a rear side, and the sounds may be radiated from the front side and the rear side to the first cavity 122 and the second cavity 123, respectively. For example, in a situation where the driving component includes the coil and the magnetic circuit assembly, the front side of the acoustic driver 121 may be the side of the diaphragm that is away from the driving component (i.e., there may be no driving component on the front side of the acoustic driver 121). The rear side of the acoustic driver 121 may be the side of the diaphragm facing the driving component (i.e., there may be a driving component on the rear side of the acoustic driver 121) or the side of the driving component departs from the diaphragm. When vibrating, the front side and the rear side bounded by the diaphragm may generate sounds with the same amplitudes and opposite phases. By disposing a sound transmission path of the sound in the acoustic output device 100, it may enable the first sound to radiate from the first acoustic hole after passing through the first cavity 122 and the second sound to radiate from the second acoustic hole after passing through the second cavity 123 to have a specific phase difference (e.g., the phase difference is in a range of 120°-179°). In some embodiments, the first cavity 122 and the second cavity 123 may be located at both sides of the diaphragm, respectively. When the diaphragm vibrates, the diaphragm may radiate sound to the first cavity 122 and the second cavity 123, respectively. The sound radiated by the diaphragm to the first cavity 122 may be transmitted to the first acoustic hole along a first sound transmission path and radiated outwardly from the first acoustic hole; the sound radiated by the diaphragm to the second cavity 123 may be transmitted to the second acoustic hole along a second sound transmission path and radiated outwardly from the second acoustic hole. In some embodiments, the phases of the first sound and the second sound may be regulated by disposing the acoustic structures of the first cavity 122 and/or the second cavity 123.

In some embodiments, there may be two or more acoustic drivers 121. Two acoustic drivers 121 may be driven by two groups of electrical signals, respectively. The two acoustic drivers 121 may radiate the sounds to the first cavity 122 and the second cavity 123, respectively. In some embodiments, the phases and amplitudes of the sounds radiated from the two acoustic drivers 121 to the first cavity 122 and the second cavity 123 may be regulated by disposing the amplitudes and the phases of the electrical signals driving the two acoustic drivers 121, thereby regulating the amplitude and the phase of the first sound radiated from the first acoustic hole through the first cavity 122, and the amplitude and the phase of the second sound radiated from the second acoustic hole through the second cavity 123. In some embodiments, the phases of the first sound and the second sound may further be regulated by disposing acoustic structures of the first cavity 122 and/or the second cavity 123.

The first cavity 122 and the second cavity 123 may be cavities acoustically coupled to the acoustic driver 121. The first cavity 122 and the second cavity 123 may be configured to transmit the sound generated by the acoustic driver 121. The sound within the first cavity 122 may be radiated outwardly through the first acoustic hole, and the sound within the second cavity 123 may be radiated outwardly through the second acoustic hole. In some embodiments, there may be one or more first acoustic holes and/or one or more second acoustic holes. A number of acoustic holes may be reasonably disposed according to actual needs, and the present disclosure does not specifically limit this.

In some embodiments, the acoustic structures in a cavity (the first cavity 122, the second cavity 123) may change the phase of the sound radiated from the acoustic holes of the cavity. In some embodiments, by disposing the acoustic structures of the first cavity 122 and/or the second cavity 123, the phase of the first sound radiated from the first acoustic hole by the acoustic driver 121 and/or the phase of the second sound radiated from the second acoustic hole by the acoustic driver 121 may be regulated, thereby regulating the phase difference between the first sound and the second sound, and reducing the sound leakage of the acoustic output device 100. For example, when the front side and the rear side of the acoustic driver 121 respectively generate the sounds of opposite phases, a baffle may be provided in the first cavity 122 and/or the second cavity 123 to create different sound paths in the two cavities. This results in different phase variations of the first sound and the second sound during propagation within the cavities, thereby adjusting the phase difference between the first sound and the second sound (i.e., the phase difference between the phase of the first sound at the first acoustic hole and the phase of the second sound at the second acoustic hole). As another example, specific acoustic structures may be implemented in at least one of the first cavity 122 and/or the second cavity 123 to change propagation speeds of the first sound and the second sound in the cavity, thereby adjusting the phase difference between the first sound and the second sound. An exemplary specific acoustic structure may include a slow acoustic structure that slows down the sound propagation speed, such as an acoustic mesh, an acoustic porous material, etc. As another example, an expansion acoustic structure (e.g., an expansion cavity) may be provided in the first cavity 122 and/or the second cavity 123 to change the equivalent propagation speed of the first sound and the second sound within the cavity, thus adjusting the phase difference between the first sound and the second sound. As still an example, a sound absorption structure (e.g., a resonance cavity) may be provided in the first cavity 122 and/or the second cavity 123 to modulate the sound near a resonance frequency of the sound absorption structure, thereby adjusting the phase difference between the first sound and the second sound. For specific descriptions about regulating the phase difference between the first sound and the second sound by providing an acoustic structure in the first cavity 122 and/or the second cavity 123, please refer to elsewhere of the present disclosure, such as FIGS. 7A-10B and their descriptions.

In some embodiments, when there are two acoustic drivers 121, the phase difference between the first sound and the second sound may also be adjusted by setting the phases of the electrical signals driving the two acoustic drivers 121.

In some embodiments, when the phase difference between the first sound and the second sound lies in a specific range (e.g., 120°-179°), within a target frequency band, even if sound pressures of the near-field sound radiated from the first acoustic hole and the near-field sound radiated from the second acoustic hole are similar, the sound radiated by the acoustic output device 100 toward the far-field may also have directivity, so that a radiated field of the sound at the far-field has at least one strong directional direction (the sound pressures in the strong directional direction and the neighboring directions are sufficiently high), while radiation strengths of the other directions are all relatively small. For example, the near-field sounds radiated from the first cavity 122 and the second cavity 123 may have a near-field sound pressure level difference of less than 6 dB, and the sounds radiated from the first cavity 122 and the second cavity 123 may have a far-field sound pressure level difference of not less than 3 dB in at least a pair of opposite directions (e.g., a direction pointing toward the ear canal opening R1 and a direction away from the ear canal opening R1 when the user wears the acoustic output device 100). As another example, the near-field sounds radiated from the first cavity 122 and the second cavity 123 may have a near-field sound pressure level difference of less than 3 dB, and the sound radiates from the first cavity 122 and the second cavity 123 may have a far-field sound pressure level difference of not less than 6 dB in at least a pair of opposite directions. It should be understood that the smaller the near-field sound pressure level difference, the more significant the sound waves of the same amplitudes and opposite phases in the far-field cancel out, and the better the effect of reducing the sound leakage. Furthermore, the greater the far-field sound pressure level difference, the stronger the directivity of the far-field sound, and the smaller the sound leakage in the direction away from the ear canal opening (e.g., a direction that is away from the ear canal opening R1) and the other directions, i.e., the better the effect of reducing the far-field sound leakage. In some embodiments, when the user wears the acoustic output device 100, the strong directional direction may be pointed toward the user's ear canal opening R1. In this way, when the user wears the acoustic output device 100, the sound delivered to the user's ear canal opening R1 may be great enough while also reducing the sound leakage in other directions (e.g., the direction that is away from the ear canal opening), thereby improving the user's listening experience and privacy.

It should be noted that a phase of a sound radiating from an acoustic hole (including the first acoustic hole and the second acoustic hole) as described in the embodiments of the present disclosure may refer to the phase of the sound measured at 4 mm (e.g., a position of 4 mm ahead of the acoustic hole) from the acoustic hole (or a geometric center of the acoustic hole). In some embodiments, the phase difference may be measured by measuring the phases of sounds (the first sound and the second sound, respectively) radiating from the first acoustic hole and the second acoustic hole, respectively, and then the phase difference between the first sound and the second sound may be calculated. When testing the sound from the first acoustic hole (or the second acoustic hole), a baffle may be used to separate the first acoustic hole and the second acoustic hole to avoid the second acoustic hole (or the first acoustic hole) interfering with the test. Further, a sound collection device may be placed on a line connecting the first acoustic hole and the second acoustic hole and is 4 mm away from the first acoustic hole (or the second acoustic hole) to collect the first sound, which further avoids the second acoustic hole (or the first acoustic hole) from interfering with the test. For illustrative purposes only, the dimensions of the baffle may adopt a standard size. For example, the length, width, and height dimensions of the baffle may be 1650 mm, 1350 mm, and 30 mm, respectively. It should be further noted that when there are two or more first acoustic holes (or second acoustic holes), any one of the first acoustic holes (or second acoustic holes) may be chosen for testing. For example, one of the first acoustic holes and one of the second acoustic holes located at a particular relative position (e.g., at a location with a minimum or maximum relative distance) may be chosen to test the phases of the sounds transmitted therefrom respectively and the phase difference may be calculated. Moreover, the sound measurement within a specific frequency band (e.g., 1000 Hz-8000 Hz) may not be achieved by exhaustive enumeration. Instead, the sound measurement may be implemented by setting a plurality of (e.g., 20-30) frequency sampling points of equal steps and with band endpoints as endpoints, and measuring the sound at each sampling point respectively.

In some embodiments, the acoustic output device 100 may include a support structure 110 and a sound generation component 120. The acoustic driver 121 as well as the first cavity 122 and the second cavity 123 acoustically coupled to the acoustic driver 121 may be disposed in the sound generation component 120.

The sound generation component 120 may be configured to generate and radiate the sound outwardly. In some embodiments, the acoustic output device 100 may place the sound generation component 120 by the support structure 110 at a location near the user's ear without blocking the user's ear canal. In some embodiments, a projection of the sound generation component 120 on a user's ear plane may partially or fully cover but not block the user's ear canal. In some embodiments, the projection of the sound generation component 120 on the user's ear plane may not cover the user's ear canal, thereby enabling the user's ear to remain open. With the user's ear remaining open, the user may be able to both hear the sound output from the sound generation component 120 and at the same time access the sound of the external environment.

The support structure 110 may be configured to carry the sound generation component 120. In some embodiments, the support structure 110 may be hung on the user's ear, head, or upper torso while the user wears the acoustic output device 100. In some embodiments, the support structure 110 may include an arcuate structure that adapts to the user's auricle R2. Merely by way of example, the arcuate structure may include but is not limited to, a hook, a C-shape, etc. When the user wears the acoustic output device 100, the support structure 110 may be hung or clamped to the user's auricle R2, thereby enabling the wearing of the acoustic output device 100. In some embodiments, the support structure 110 may also include an ear hook structure adapted to fit on the user's head or upper torso. When the user wears the acoustic output device 100, the ear hook structure may be disposed on the user's auricle R2 through the user's head or neck to enable the wearing of the acoustic output device 100.

In some embodiments, the support structure 110 may be made of a material that is relatively soft, or relatively hard, or a combination thereof. A relatively soft material refers to a material with a hardness (e.g., Shore hardness) smaller than a first hardness threshold (e.g., 15A, 20A, 30A, 35A, 40A, etc.). For example, the Shore hardness of the relatively soft material may range from 45-85A, 30-60D. A relatively hard material refers to a material with a hardness (e.g., Shore hardness) greater than a second hardness threshold (e.g., 65D, 70D, 80D, 85D, 90D, etc.). Exemplary relatively soft materials may include, but are not limited to, polyurethanes (PU) (e.g., thermoplastic polyurethane elastomers (TPU)), polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF) resin, urea-formaldehyde (UF) resin, melamine-formaldehyde (MF) resin, silicone, or combinations thereof. Exemplary relatively hard materials may include, but are not limited to, poly(ester-sulfones) (PES), polyvinylidene chloride (PVDC), polymethyl methacrylate (PMMA), polyether ether ketone (PEEK), or combinations thereof, or mixtures thereof with reinforcing agents such as a glass fiber, a carbon fiber, or the like. In some embodiments, the material of the support structure 110 may be selected based on a specific requirement. For example, using the relatively soft material may enhance comfort and fit with the user's ear when wearing the acoustic output device 100, while using the relatively hard material may enhance strength of the acoustic output device 100.

In some embodiments, the acoustic output device 100 may also include only the sound generation component 120. For example, when wearing the acoustic output device 100, the sound generation component 120 may be stuck directly at a position within the ear cavity without blocking the ear canal. At this time, the acoustic output device 100 may not need to carry the sound generation component 120 by disposing the support structure 110.

In some embodiments of the present disclosure, the acoustic output device, by regulating the phase difference between two sounds generated by the sound generation component, may ensure that the near-field sound radiated from the first acoustic hole and the near-field sound radiated from the second acoustic hole have a small sound pressure level difference in the target frequency band while also ensuring that the sound radiated to the far-field by the acoustic output device having directivity, so that the sounds radiated to the outside environment through the first acoustic hole and the second acoustic hole can cancel out each other in the far-field in a specific direction, thereby reducing the sound leakage in the far-field.

The target frequency band may be a more sensitive frequency range for a human ear. In some embodiments, as the human ear is more sensitive in the 200 Hz-5000 Hz frequency band, the target frequency band may be 200 Hz-5000 Hz or a portion thereof. For example, in order to enable the acoustic output device 100 to have less sound leakage in a main frequency band of a human voice, the target frequency band may be 200 Hz-800 Hz. As another example, the target frequency band may be 2000 Hz-4000 Hz, which is the most sensitive frequency band for the human ear. As another example, the target frequency band may also be 500 Hz-4000 Hz, 500 Hz-3000 Hz, 500 Hz-2000 Hz, 500 Hz-1000 Hz, 1000 Hz-4000 Hz, 1500 Hz-3000 Hz, 1500 Hz-2000 Hz, etc. In some embodiments, the target frequency band may include a segment of continuous frequency range or may include a plurality of discrete frequency points. For example, the target frequency band may include target frequency points such as 500 Hz, 1000 Hz, 2000 Hz, 4000 Hz, etc., so that the sound of the acoustic output device 100 at all the above-mentioned frequency points meets the purposes of near-field sound pressure proximity, and far-field presenting directivity (e.g., cardioid directivity).

As the human ear is more sensitive to the frequency range of 200 Hz-5000 Hz, the target frequency band may be set to this frequency range to achieve a more effective reduction of far-field sound leakage to meet the actual needs.

The near-field sound pressure level difference refers to a difference between sound pressure levels of the sounds radiated to a near-field position from the two or more sound sources formed by the acoustic output device 100. In the present disclosure, the near-field position of a sound source may refer to a position that is within 5 mm from the sound source (e.g., the first acoustic hole or the second acoustic hole). For ease of understanding, the near-field sound pressure level difference may be expressed as the difference between the sound pressure level at the first acoustic hole and the sound pressure level at the second acoustic hole of the acoustic output device 100.

In some embodiments, the near-field sound pressure level difference may be tested by measuring the sound pressures of the sounds (the first sound and the second sound, respectively) radiated from the first acoustic hole and the second acoustic hole, then calculating (e.g., taking a common logarithm of a ratio of a sound pressure to be measured and a reference sound pressure, and then multiplying the common logarithm by 20 to obtain the sound pressure level) to determine the sound pressure level difference between the first sound and the second sound. In some embodiments, when testing the sound of the first acoustic hole (or the second acoustic hole), the baffle may be used to separate the first acoustic hole and the second acoustic hole to prevent the second acoustic hole (or the first acoustic hole) from interfering with the test. The sound pressure at the first acoustic hole may be understood as the sound pressure at a position near the first acoustic hole, and the sound pressure at the second acoustic hole may be understood as the sound pressure at a position near the second acoustic hole. For example, the sound collection device may be disposed to obtain the sound pressure of the first sound (or the second sound) at a position with a distance of 4 mm from the first acoustic hole (or the second acoustic hole), and the sound pressure of the first sound (or the second sound) may be regarded as the sound pressure at the first acoustic hole (or at the second acoustic hole).

In some embodiments, when testing the sounds of the first acoustic hole and the second acoustic hole, the positions (i.e., the collection positions) of 4 cm from the first acoustic hole and the second acoustic hole may be in a pair of opposite directions of the acoustic output device 100, respectively (e.g., the position that is of 4 cm from the first acoustic hole may be in a direction where the second acoustic hole points towards the first acoustic hole, and the position that is of 4 cm from the second acoustic hole may be in a direction where the first acoustic hole points towards the second acoustic hole). The sound collection device may be placed at each of the two collection positions to obtain the sound pressure levels of the acoustic output device 100, and a difference between the two sound pressure levels may be calculated, i.e., the near-field sound pressure level difference between the first acoustic hole and the second acoustic hole.

Figure 3A:
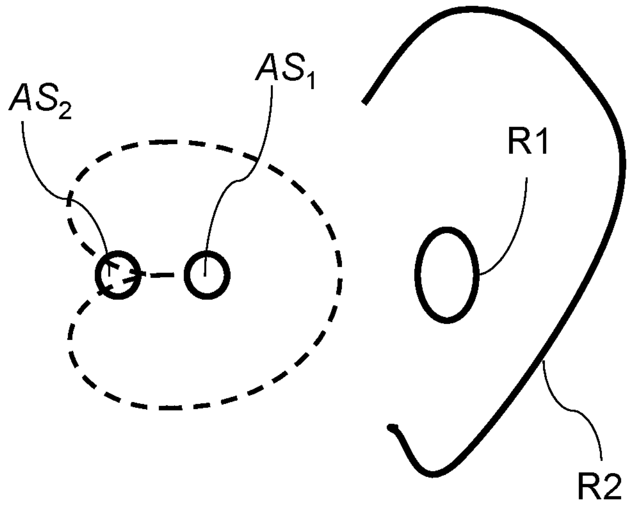
FIG. 3A is a schematic diagram illustrating a directional radiating sound field of an acoustic output device according to some embodiments of the present disclosure.
Figure 3B:
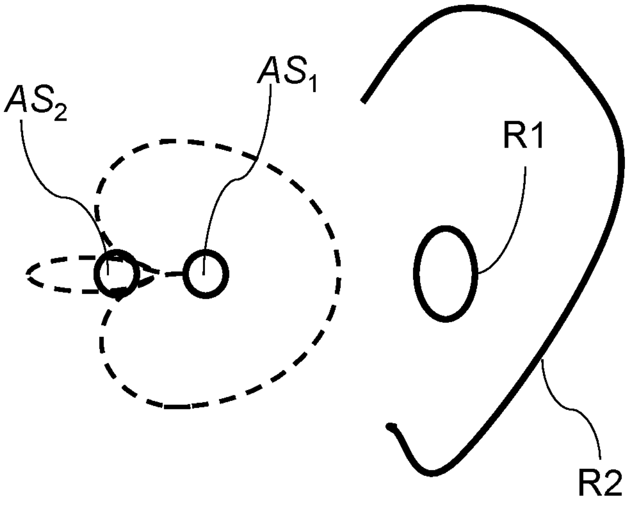
FIG. 3B is a schematic diagram illustrating an exemplary directional radiating sound field of an acoustic output device according to some other embodiments of the present disclosure.
Figure 3C:
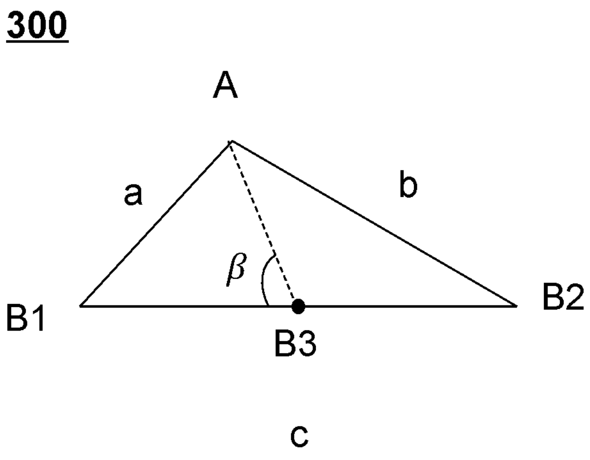
FIG. 3C is a schematic diagram illustrating a mode for calculating a distance between acoustic centers according to some embodiments of the present disclosure.

For the specific content of the acoustic center, please refer to FIGS. 3A-3C and their related descriptions.

In some embodiments of the present disclosure, by controlling the near-field sound pressures of the sounds radiated at the first acoustic hole and the second acoustic hole to be similar, it can ensure that the first sound and the second sound are effectively interfered and canceled out each other in a specific direction in the far-field, thereby effectively reducing the sound leakage of the acoustic output device 100 in the far-field.

Figure 2B:
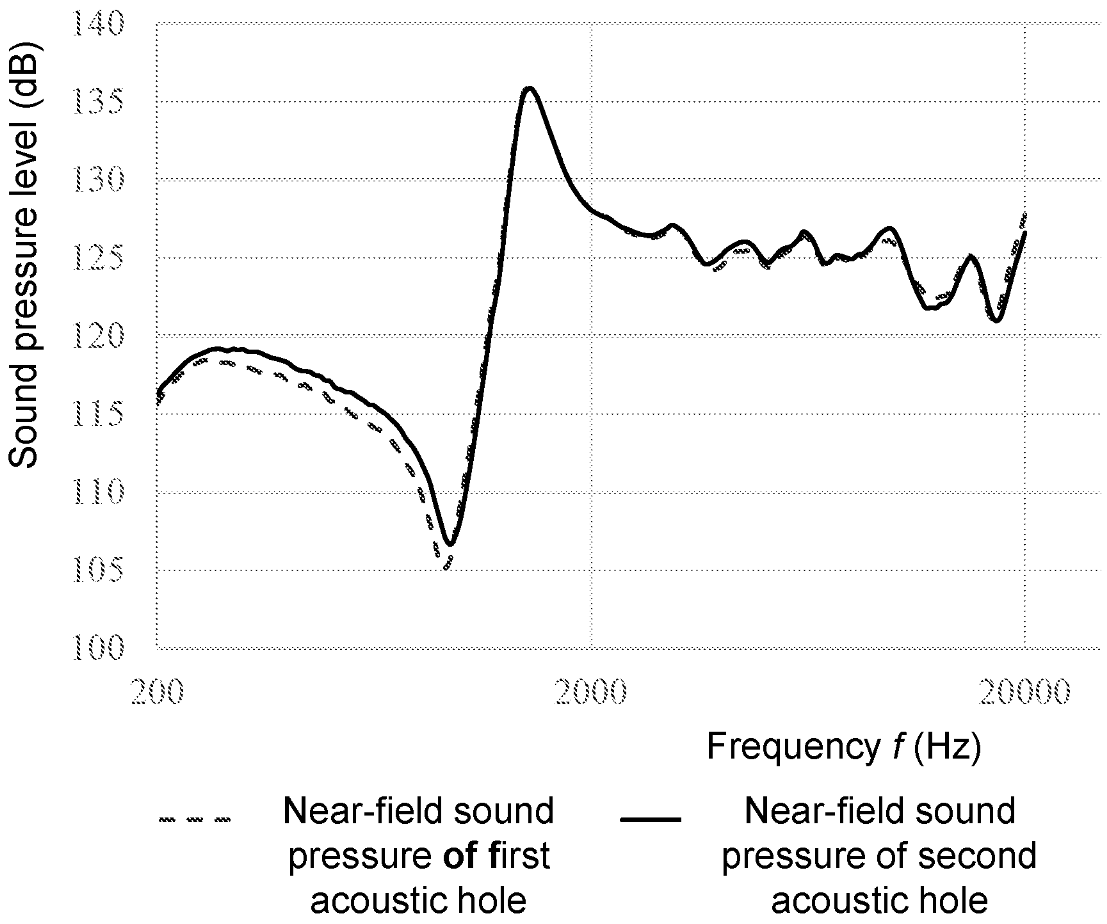
FIG. 2B is a curve diagram illustrating changes of near-field sound pressure levels of a first acoustic hole and a second acoustic hole along with a frequency according to some embodiments of the present disclosure.

Exemplarily, FIG. 2B is a curve diagram illustrating changes of near-field sound pressure levels of a first acoustic hole and a second acoustic hole along with a frequency according to some embodiments of the present disclosure. As shown in FIG. 2B, the change trends of the near-field sound pressure levels of the first acoustic hole and the second acoustic hole of the acoustic output device 100 remain substantially the same in a frequency range of 200 Hz-20 kHz, with a difference of less than 5 dB, to effectively reduce the sound leakage in the far-field of the acoustic output device 100 in the frequency range of 200 Hz-20 kHz.

The near-field sound pressure level difference may be adjusted in a variety of ways. In some embodiments, the near-field sound pressure level difference may be adjusted by adjusting an area ratio of the first acoustic hole to the second acoustic hole.

The area ratio refers to a ratio of an area S1 of the first acoustic hole to an area S2 of the second acoustic hole, i.e., the area ratio is equal to S1/S2. Understandably, when there are two or more first acoustic holes (or second acoustic holes), the area ratio may be the ratio of a total area (S1=S11+S12+S13 . . . +S1$n$) of the first acoustic holes to a total area (S2=S21+S22+S23 . . . +S2$m$) of the second acoustic holes, wherein n and m are integers greater than 1.

In some embodiments, the ratio (i.e., the area ratio) of the area of the first acoustic hole to the area of the second acoustic hole may be 0.2, 0.5, 1, 1.5, 2, 2.5, etc. In some embodiments, the area of the first acoustic hole to the area of the second acoustic hole may be in a range of 0.5-2. By controlling a range of the area ratio of the first acoustic hole and the second acoustic hole to make the area of the first acoustic hole close to the area of the second acoustic hole, acoustic resistances of the first acoustic hole and the second acoustic hole may be made close to each other, so that the near-field sound pressure level difference between the first acoustic hole and the second acoustic hole is able to be reduced, which in turn makes the cancellation of the far-field sound leakage more significantly, and improves an effect of reducing the far-field sound leakage.

Furthermore, the range of the area ratio of the first acoustic hole to the second acoustic hole may be 0.8-1.25, 0.9-1.1, or 0.95-1.1. By further narrowing the range of the area ratio of the first acoustic hole to the second acoustic hole, and reducing the sound pressure level difference in the near-field, the effect of reducing the sound leakage in the far-field may be further improved.

In some embodiments, the near-field sound pressure level difference may also be adjusted by adjusting a difference between acoustic loads of the first acoustic hole and the second acoustic hole.

The acoustic load refers to a ratio of a sound pressure value P1 after passing through the first acoustic hole (or the second acoustic hole) to a sound pressure value P0 without passing through the first acoustic hole (or the second acoustic hole), i.e., the acoustic load is equal to P1/P0. It should be noted that for a certain acoustic hole, the greater the acoustic load (or, the more it converges to 1), the smaller the acoustic resistance.

In some embodiments, the acoustic load may be determined based on the sound pressure value (equivalent to P1) when the first acoustic hole (or the second acoustic hole) is covered with gauze and the sound pressure value (equivalent to P0) when the first acoustic hole (or the second acoustic hole) is not covered with the gauze measured at a position from a specific distance, respectively. The acoustic load of the first acoustic hole (or the second acoustic hole) may be determined by calculating a ratio value of P1 to P0. Specifically, when testing the sound of the first acoustic hole (or the second acoustic hole), the sound collection device may be set at a distance of 4 mm-5 mm from the first acoustic hole (or the second acoustic hole), then the sound collection device may collect the sound pressure value (equivalent to P1) of the first acoustic hole (or the second acoustic hole) with the gauze and the sound pressure value (equivalent to P0) of the first acoustic hole (or the second acoustic hole) without the gauze. Finally, the sound load of the first acoustic hole (or the second acoustic hole) can be determined. It should be noted that a test signal for the acoustic load may be selected as a single-frequency signal, in which one or more frequency points may be selected, including but not limited to 100 Hz, 200 Hz, 300 Hz, 500 Hz, 1000 Hz, 2000 Hz, 5000 Hz, and the resonance frequency f0 point of the acoustic output device 100, etc. The test signal may further be selected as a white noise, a pink noise, and a sweep signal. It should be noted that in some embodiments, the measured sound pressure level may need to be converted to a sound pressure value before calculation to obtain the acoustic load. Alternatively, a difference between the sound pressure level measured before and after the first acoustic hole (or the second acoustic hole) is covered with the gauze may be obtained, and then the value of the acoustic load of the first acoustic hole (or the second acoustic hole) may be inverted by a logarithmic formula.

In some embodiments, the difference between the acoustic loads of the first acoustic hole and the second acoustic hole may include 0.1, 0.15, 0.2, etc. In some embodiments, the difference between the acoustic loads of the first acoustic hole and the second acoustic hole may be less than 0.15. It should be understood that the smaller the difference between the acoustic loads of the first acoustic hole and the second acoustic hole, the closer the acoustic resistances of the first acoustic hole and the second acoustic hole, and thus the smaller the difference between the near-field sound pressure levels of the first acoustic hole and the second acoustic hole, and thus the more significant the effect of reducing the sound leakage in the far-field.

Further, the difference between the acoustic loads of the first acoustic hole and the second acoustic hole may be less than 0.1. By further narrowing the range of the difference between the acoustic loads of the first acoustic hole and the second acoustic hole, the difference between the near-field sound pressure levels of the first acoustic hole and the second acoustic hole may be further reduced, thereby further improving the effect of reducing the sound leakage in the far-field.

In some embodiments, in order to make the far-field sound leakage of the acoustic output device 100 relatively small in a range of 200 Hz-5000 Hz, the difference between the acoustic loads of the first acoustic hole and the second acoustic hole may be in a range of 0-0.05. In some embodiments, in order to make the far-field sound leakage of the acoustic output device 100 relatively small in a range of 500 Hz-4000 Hz, the difference between the acoustic loads of the first acoustic hole and the second acoustic hole may be in a range of 0-0.07. In some embodiments, in order to make the far-field sound leakage of the acoustic output device 100 relatively small in a range of 1000 Hz-3000 Hz, the difference between the acoustic loads of the first acoustic hole and the second acoustic hole may be in a range of 0-0.1. In some embodiments, in order to make the far-field sound leakage of the acoustic output device 100 relatively small in a range of 1500 Hz-2500 Hz, the difference between the acoustic loads of the first acoustic hole and the second acoustic hole may be in a range of 0-0.12.

In some embodiments, the near-field sound pressure level difference may also be adjusted by adjusting a ratio of a surface acoustic load of the first acoustic hole to a surface acoustic load of the second acoustic hole.

The surface acoustic load refers to a product of the ratio of the sound pressure value P1 after passing through the first acoustic hole (or the second acoustic hole) to the sound pressure value P0 without passing through the first acoustic hole (or the second acoustic hole) and the area of the first acoustic hole (or the second acoustic hole) S. That is, the surface acoustic load may be equal to S×P1/P0.

In some embodiments, the ratio of the surface acoustic load of the first acoustic hole to the surface acoustic load of the second acoustic hole may be in a range of 0.5, 1, 2.5, etc. In some embodiments, the ratio of the surface acoustic load of the first acoustic hole to the surface acoustic load of the second acoustic hole may be in a range of 0.5-3.5. By adjusting the ratio of the surface acoustic load of the first acoustic hole to the surface acoustic load of the second acoustic hole to keep the ratio in a suitable range, the acoustic resistances of the first acoustic hole and the second acoustic hole may be made closer, thus reducing the near-field sound pressure level difference of the first acoustic hole and the second acoustic hole, so as to improve the effect of reducing the far-field sound leakage.

Further, the ratio of the surface acoustic load of the first acoustic hole to the surface acoustic load of the second acoustic hole may be in a range of 0.8-2. It should be understood that by further narrowing the range of the ratio of the surface acoustic load of the first acoustic hole to the surface acoustic load of the second acoustic hole, the effect of reducing the far-field sound leakage may be made more significant.

In some embodiments, in order to make the far-field sound leakage of the acoustic output device 100 relatively small in a range of 200 Hz to 5000 Hz, the ratio of the surface acoustic load of the first acoustic hole to the surface acoustic load of the second acoustic hole may be in a range of 0.9 to 1.2. In some embodiments, in order to make the far-field sound leakage of the acoustic output device 100 relatively small in a range of 500 Hz-4000 Hz, the ratio of the surface acoustic load of the first acoustic hole to the surface acoustic load of the second acoustic hole may be in a range of 0.8-1.5. In some embodiments, in order to make the far-field sound leakage of the acoustic output device 100 relatively small in a range of 1000 Hz-3000 Hz, the ratio of the surface acoustic load of the first acoustic hole to the surface acoustic load of the second acoustic hole may be in a range of 0.7-2. In some embodiments, in order to make the far-field sound leakage of the acoustic output device 100 relatively small in a range of 1500 Hz-2500 Hz, the ratio of the surface acoustic load of the first acoustic hole to the surface acoustic load of the second acoustic hole acoustic load may be in a range of 0.6-2.7. In some embodiments, in order to make the far-field sound leakage of the acoustic output device 100 relatively small in a range of 1500 Hz-2000 Hz, the ratio of the surface acoustic load of the first acoustic hole to the surface acoustic load of the second acoustic hole acoustic load may be in a range of 0.5 to 3.5.

The far-field sound pressure level difference refers to a difference between sound pressure levels of sounds radiated in the far-field by the first acoustic hole and the second acoustic hole, respectively. In the present disclosure, a far-field of the first acoustic hole (or the second acoustic hole) may refer to a position at more than 10 cm from the first acoustic hole (or the second acoustic hole). For ease of understanding, the far-field sound pressure level difference between the first acoustic hole and the second acoustic hole may be expressed as the difference between the sound pressure levels of the first acoustic hole and the second acoustic hole at positions that are of the same or approximately the same distance from the two holes and farther from the two holes in a direction of a line connecting the first acoustic hole and the second acoustic hole.

It should be noted that the far-field sound pressure level difference is tested in a way similar to that of the near-field sound pressure level difference, and the similarities are not repeated. The difference may be that, when measuring the far-field sound pressure level, for example, when collecting the sound of the first acoustic hole (or the second acoustic hole), the sound collection device may be disposed at a position of 30 cm from the first acoustic hole (or the second acoustic hole) for collection.

In some embodiments, the at least one pair of opposite directions may include two opposite directions in the direction of the line connecting the first acoustic hole and the second acoustic hole. For example, when a user wears the acoustic output device 100, the direction pointing toward the ear canal opening R1 and the direction away from the ear canal opening R1 are the pair of opposite directions.

In some embodiments, the at least one pair of opposite directions may also include two directions that satisfy a predetermined angle range with respect to a certain positional point. For example, the at least one pair of opposite directions may include two directions formed by lines connecting a midpoint of the line connecting the first acoustic hole and the second acoustic hole and each of the two positional points in the far-field proximate to the first acoustic hole and the second acoustic hole and satisfied a predetermined angle range. The predetermined angle range may include, but is not limited to, 150°-180°, etc. In this way, a variety of situations that may occur in a process of a practical application may be considered comprehensively, so that the effect of canceling the far-field sound leakage is able to be made more secure. For example, in an actual product, a strong directional radiating sound field, e.g., a cardioid directional radiating sound field, may be tilted or aberrated, and at this time, due to the tilting or aberration of the cardioid directional radiating sound field, the acoustic output device 100 may have stronger sound leakage in various directions, thereby affecting the performance of the acoustic output device 100. At this time, a pair of corresponding directions may be given for the possible tilts or distortions to change the strong directional radiating sound field into a more standard strong directional radiating sound field. For example, when the strong directional radiating sound field is tilted or aberrated, it may make one of the at least one pair of opposite directions still be the direction of the line connecting the first acoustic hole and the second acoustic hole, and make the other direction form an angle of 10° with the opposite direction of the line connecting the first acoustic hole and the second acoustic hole; or make each of the at least one pair of opposite directions form a certain angle (e.g., 5°, 10°, 15°, 20°) with the line connecting the first acoustic hole and the second acoustic hole, etc.

In some embodiments, in order to make the far-field sound leakage of the acoustic output device 100 relatively small in a range of 200 Hz-5000 Hz, the near-field sound pressure level difference may be less than 6 dB, and the far-field sound pressure level difference may be not less than 12 dB. In some embodiments, in order to make the far-field sound leakage of the acoustic output device 100 relatively small in a range of 500 Hz-4000 Hz, the near-field sound pressure level difference may be less than 5 dB, and the far-field sound pressure level difference may be not less than 10 dB. In some embodiments, in order to make the far-field sound leakage of the acoustic output device 100 relatively small in a range of 1000 Hz-3000 Hz, the near-field sound pressure level difference may be less than 4 dB, and the far-field sound pressure level difference may be not less than 8 dB. In some embodiments, in order to make the far-field sound leakage of the acoustic output device 100 relatively small in a range of 1500 Hz-2500 Hz, the near-field sound pressure level difference may be less than 3 dB, and the far-field sound pressure level difference may be not less than 4 dB. In some embodiments, in order to make the far-field sound leakage of the acoustic output device 100 relatively small in a range of 1500 Hz-2000 Hz, the near-field sound pressure level difference may be less than 2 dB, and the far-field sound pressure level difference may be not less than 3 dB.

In some embodiments, in order to make the far-field sound leakage of the acoustic output device 100 relatively small in a range of 200 Hz to 5000 Hz, the far-field sound pressure level difference may be not less than 12 dB. At this time, the difference between the acoustic loads of the first acoustic hole and the second acoustic hole may be in a range of 0-0.03. In some embodiments, in order to make the far-field sound leakage of the acoustic output device 100 relatively small in a range of 500 Hz-4000 Hz, the far-field sound pressure level difference may be not less than 10 dB. At this time, the difference between the acoustic loads of the first acoustic hole and the second acoustic hole may be in a range of 0-0.05. In some embodiments, in order to make the far-field sound leakage of the acoustic output device 100 relatively small in a range of 1000 Hz-3000 Hz, the far-field sound pressure level difference may be not less than 6 dB.

At this time, the difference between the acoustic loads of the first acoustic hole and the second acoustic hole may be in a range of 0-0.1. In some embodiments, in order to make the far-field sound leakage of the acoustic output device 100 relatively small in a range of 1500 Hz-2500 Hz, the far-field sound pressure level difference may be not less than 4 dB. At this time, the difference between the acoustic loads of the first acoustic hole and the second acoustic hole may be in a range of 0-0.12. In some embodiments, in order to make the far-field sound leakage of the acoustic output device 100 relatively small in a range of 1500 Hz-2000 Hz, the far-field sound pressure level difference may be not less than 3 dB. At this time, the difference between the acoustic loads of the first acoustic hole and the second acoustic hole may be in a range of 0-0.15.

In some embodiments, in order to make the far-field sound leakage of the acoustic output device 100 relatively small in a range of 200 Hz-5000 Hz, the far-field sound pressure level difference may be not less than 12 dB. At this time, the ratio of the area of the first acoustic hole to the area of the second acoustic hole may be in a range of 0.75-1.1. In some embodiments, in order to make the far-field sound leakage of the acoustic output device 100 relatively small in a range of 500 Hz-4000 Hz, the far-field sound pressure level difference may be not less than 10 dB. At this time, the ratio of the area of the first acoustic hole to the area of the second acoustic hole may be in a range of 0.7-1.2. In some embodiments, in order to make the far-field sound leakage of the acoustic output device 100 relatively small in a range of 1000 Hz-3000 Hz, the far-field sound pressure level difference may be not less than 6 dB. At this time, the ratio of the area of the first acoustic hole to the area of the second acoustic hole may be in a range of 0.6-1.5. In some embodiments, in order to make the far-field sound leakage of the acoustic output device 100 relatively small in a range of 1500 Hz-2500 Hz, the far-field sound pressure level difference may be not less than 4 dB. At this time, the ratio of the area of the first acoustic hole to the area of the second acoustic hole may be in a range of 0.6-1.7. In some embodiments, in order to make the far-field sound leakage of the acoustic output device 100 relatively small in a range of 1500 Hz-2000 Hz, the far-field sound pressure level difference may be not less than 3 dB. At this time, the ratio of the area of the first acoustic hole to the area of the second acoustic hole may be in a range of 0.5-1.9.

In some embodiments, in order to make the far-field sound leakage of the acoustic output device 100 relatively small in a range of 200 Hz-5000 Hz, the far-field sound pressure level difference may be not less than 12 dB. At this time, the ratio of the surface acoustic load of the first acoustic hole and the surface acoustic load of the second acoustic hole may be in a range of 0.9-1.2. In some embodiments, in order to make the far-field sound leakage of the acoustic output device 100 relatively small in a range of 500 Hz-4000 Hz, the far-field sound pressure level difference may be not less than 10 dB. At this time, the ratio of the surface acoustic load of the first acoustic hole and the surface acoustic load of the second acoustic hole may be in a range of 0.8-1.5. In some embodiments, in order to make the far-field sound leakage of the acoustic output device 100 relatively small in a range of 1000 Hz-3000 Hz, the far-field sound pressure level difference may be not less than 6 dB. At this time, the ratio of the surface acoustic load of the first acoustic hole and the surface acoustic load of the second acoustic hole may be in a range of 0.7-2. In some embodiments, in order to make the far-field sound leakage of the acoustic output device 100 relatively small in a range of 1500 Hz-2500 Hz, the far-field sound pressure level difference may be not less than 4 dB. At this time, the ratio of the surface acoustic load of the first acoustic hole and the surface acoustic load of the second acoustic hole may be in a range of 0.6-2.7. In some embodiments, in order to make the far-field sound leakage of the acoustic output device 100 relatively small in a range of 1500 Hz-2000 Hz, the far-field sound pressure level difference may be not less than 3 dB. At this time, the ratio of the surface acoustic load of the first acoustic hole and the surface acoustic load of the second acoustic hole may be in a range of 0.5-3.5.

FIG. 3A is a schematic diagram illustrating a directional radiating sound field of an acoustic output device according to some embodiments of the present disclosure. FIG. 3B is a schematic diagram illustrating an exemplary directional radiating sound field of an acoustic output device according to some other embodiments of the present disclosure. FIG. 3C is a schematic diagram illustrating a mode for calculating a distance between acoustic centers according to some embodiments of the present disclosure.

As shown in FIGS. 3A-3B, AS1 and AS2 denote a first sound source and a second sound source formed by the sound generation component 120 of the acoustic output device 100, respectively. When a first sound generated by the first sound source AS1 and a second sound generated by the second sound source AS2 has a specific phase difference (e.g., 120°-179°), the first sound source AS1 and the second sound source AS2 may form a strong directional radiating sound field, e.g., a cardioid directional radiating sound field (as shown in FIG. 3A), or a hypercardioid directional radiating sound field (as shown in FIG. 3B). It should be noted that a first acoustic hole may form a first sound source AS1. A position of the first sound source AS1 may be considered to be located at the acoustic center of the first acoustic hole. A second acoustic hole may form a second sound source AS2. A position of the second sound source AS2 may be considered to be located at the acoustic center of the second acoustic hole.

The acoustic center of an acoustic hole (e.g., the first acoustic hole or the second acoustic hole) refers to an equivalent sound generation position of the acoustic hole. The equivalent sound generation position may be determined based on the shape, size, and quantity of the acoustic hole. When there is only one acoustic hole, the acoustic center may be a geometric center of the acoustic hole (e.g., the acoustic hole may have an outer opening and an inner opening in a depth direction, and the geometric center of the acoustic hole refers to the centroid of the outer opening). When there are two acoustic holes, the acoustic center may be a midpoint of a line connecting the geometric centers of the two acoustic holes. When there are three acoustic holes, the acoustic center may be the center of a circumscribed of the geometric centers of the three acoustic holes, or alternatively, the acoustic center may be the centroid of a triangle formed by the lines connecting the geometric centers of the three acoustic holes. When there are four (or more) acoustic holes, the acoustic center may be the centroid of a quadrilateral (or polygon) formed by the lines connecting the geometric centers of the four (or more) acoustic holes.

A distance between the first and second acoustic holes refers to a distance between the acoustic center of the first acoustic hole and the acoustic center of the second acoustic hole. Taking the case where there is one first acoustic hole and two second acoustic holes as an example, the one first acoustic hole and the two second acoustic holes may form a triangle defined by three sides, and side lengths of the three sides of the triangle may be measured. Based on the side lengths of the three sides, a distance between the acoustic center of the first acoustic hole and the acoustic center of the second acoustic hole may be calculated (when there are two second acoustic holes, the acoustic center may be the midpoint of the line connecting the geometrical centers of the two acoustic holes), i.e., the distance between the first sound source AS1 and the second sound source AS2.

As shown in FIG. 3C, a geometric center A of the first acoustic hole, a geometric center B1 of the second acoustic hole, and a geometric center B2 of another second acoustic hole may form a triangle 300. The side lengths of the three sides of the triangle 300 may be measured, which are a, b, and c, respectively. The acoustic center of the first acoustic hole may be the geometric center A of the first acoustic hole, and the equivalent acoustic center of the two second acoustic holes may be the midpoint B3 of the line connecting the geometric centers (i.e., the geometric centers B1 and B2) of the two second acoustic holes. The distance between the acoustic center of the first acoustic hole and the equivalent acoustic center of the second acoustic holes may be the length of a line segment AB3 (denoted as x), and a value of x may be calculated according to the following Equations:

$$\cos\beta = -\cos(180^\circ - \beta), \tag{1}$$

$$\cos\beta = \frac{\left(\frac{c}{2}\right)^2 + x^2 - a^2}{2 \times \frac{c}{2} \times x}, \tag{2}$$

$$\cos(180^\circ - \beta) = \frac{\left(\frac{c}{2}\right)^2 + x^2 - b^2}{2 \times \frac{c}{2} \times x}, \tag{3}$$

where, β indicates an angle formed by the line segment AB3 and a line segment B1B3.

According to Equation (1)-Equation (3), it may be deduced and calculated that:

$$x = \sqrt{\frac{a^2 + b^2 - \frac{c^2}{2}}{2}}.$$

As shown in FIGS. 3A and 3B, it may be seen that the directional radiating sound field of the cardioid (FIG. 3A) or hypercardioid (FIG. 3B) has only one main lobe, and the sound field radiation at the main lobe and near the main lobe may be relatively strong, while the sound field radiation in the other directions is weak (the intensity of the sound field in the opposite direction of the main lobe may also be relatively weak). When a user wears the acoustic output device 100, the main lobe may be made to point toward the ear canal opening R1 of the listener. At this time, only the radiation pointing toward the ear canal opening R1 and its vicinity may be relatively strong, and the other directions may be weak directional directions. As a result, the sound leakage of the acoustic output device 100 may be reduced. It may be appreciated that the phase differences between the first sound and the second sound in FIGS. 3A and 3B may be different (but both lie in a specific range), and thus the radiating sound fields presented in FIGS. 3A and 3B may be different. A principle of forming a strong directional radiating sound field (e.g., a cardioid or hypercardioid directional radiating sound field) with the first sound having a specific phase difference from the second sound is described below.

Figure 4:
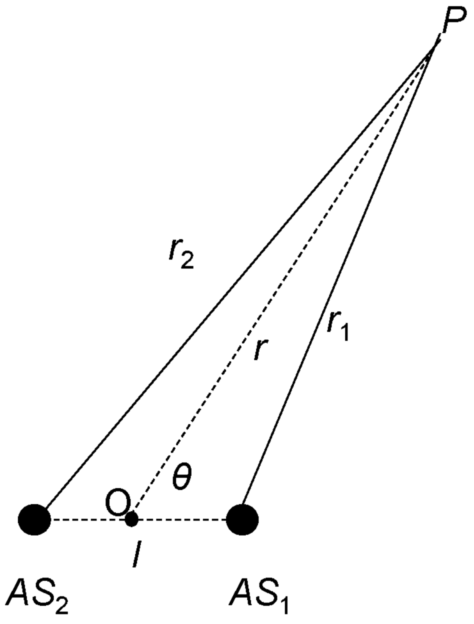
FIG. 4 is a schematic diagram illustrating radiation of exemplary dual sound sources according to some embodiments of the present disclosure.

FIG. 4 is a schematic diagram illustrating radiation of exemplary dual sound sources according to some embodiments of the present disclosure.

As shown in FIG. 4, a first sound source AS1 and a second sound source AS2 may indicate two equivalent sound sources formed by a first acoustic hole and a second acoustic hole, respectively, of the sound generation component 120 of the acoustic output device 100. P may be a point in the far-field, indicating a distance between the first sound source AS1 and the second sound source AS2. r1 indicates a distance from the first sound source AS1 to the point P. r2 indicates a distance from the second sound source AS2 to the point P. r indicates a distance from a midpoint O of a line connecting the first sound source AS1 and the second sound source AS2 to the point P. 6 indicates an angle formed by the line connecting the first sound source AS1 and the second sound source AS2 and the line connecting the midpoint O and the point P.

The sound pressures at the first sound source AS1 and the second sound source AS2 may respectively expressed as:

$$\begin{cases} S_1 = \frac{A}{r_1} e^{j(\omega t - kr_1)} \\ S_2 = \frac{A}{r_2} e^{j(\omega t - kr_2 + \varphi)} \end{cases}, \tag{4}$$

where A indicates the strength of a point sound source, ω indicates an angular frequency, j indicates an imaginary part, t indicates the time, φ indicates a phase difference between the first sound source AS1 and the second sound source AS2, and k indicates a wave vector. Under a far-field condition (r>>l, kl<<1), the distances r1, r2 may be expressed as:

$$\begin{cases} r_1 = r - \frac{l}{2}\cos\theta \\ r_2 = r + \frac{l}{2}\cos\theta \end{cases}. \tag{5}$$

Therefore, a sound pressure amplitude |p| at the far-field point P may be indicated as a superposition of the sound fields of the first sound source AS1 and the second sound source AS2:

$$|p| = |S_1 + S_2| = \left|\frac{A}{r} e^{j(\omega t - kr)}\left(e^{j\frac{kl}{2}\cos\theta} + e^{-j\frac{kl}{2}\cos\theta} e^{j\varphi}\right)\right| = G\sqrt{\left(\frac{(kl)^2}{2} - \frac{(kl)^2}{2}\cos\varphi\right)\cos^2\theta + (2kl\sin\varphi)\cos\theta + (2 + 2\cos\varphi)}. \tag{6}$$

When a cardioid directional radiating sound field is required, i.e., when 0=180° is required, there may be a minimal value of the sound pressure amplitude |p| at the far-field point P. A derivative of |p| is obtained according to the following equation:

$$|p|'_{\theta=180^\circ} = 2\cos\theta\left[\frac{(kl)^2}{2} - \frac{(kl)^2}{2}\cos\varphi\right] + [2kl\sin\varphi] = 0. \tag{7}$$

By solving equation (7) above, a relationship that a phase difference φ between the first sound source AS1 and the second sound source AS2 needs to satisfy is obtained according to the following equation:

$$\cos\varphi = \frac{(kl)^2 - 4}{(kl)^2 + 4}. \quad (8)$$

From equation (8), it can be seen that in order to make the first sound source AS1 and the second sound source AS2 form a cardioid directional radiating sound field, the phase difference φ between the two sound sources and kl may need to satisfy a certain relationship. As the wave vector k is related to the frequency f, the phase difference φ between the two sound sources may also be frequency-related.

Figure 5:
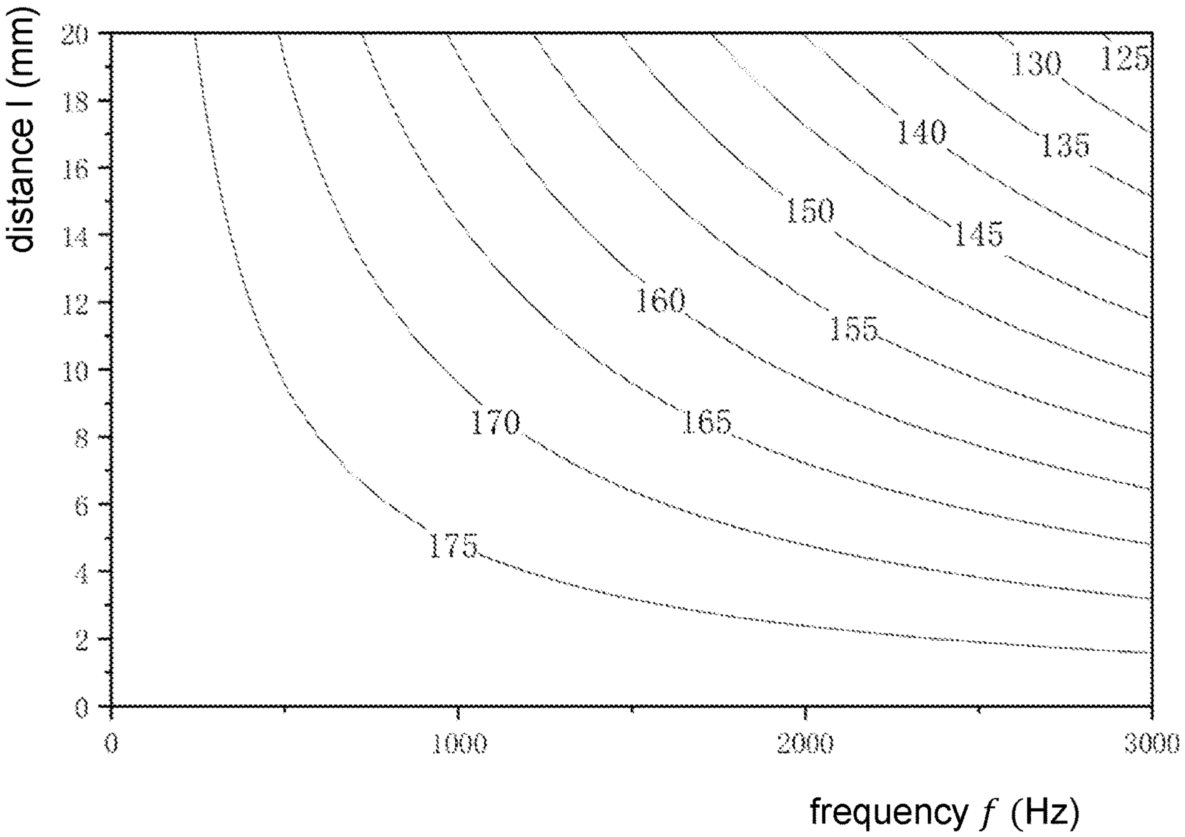
FIG. 5 is a schematic diagram illustration a relationship between a phase difference (p between a first sound source AS1 and a second sound source AS2, a frequency f, and a distance l corresponding to Equation (5)

FIG. 5 is a schematic diagram illustration a relationship between a phase difference φ between a first sound source AS1 and a second sound source AS2, a frequency f, and a distance l corresponding to Equation (5).

As shown in FIG. 5, a horizontal axis represents the frequency f in Hz, and a vertical axis represents the distance l between the two sound sources in millimeters. Each curve represents a required phase difference φ under a certain condition (i.e., a certain frequency f and a certain distance l). By comparing the curves in FIG. 5, it is observed that to achieve a cardioid directional radiating sound field, when the distances l are the same, in a preset frequency range, the phase difference between the first sound source AS1 and the second sound source AS2 may be negatively correlated with the frequency. For example, in a range of 200 Hz-2000 Hz, the higher the frequency, the smaller the phase difference between the first sound source AS1 and the second sound source AS2 is required; and the lower the frequency, the greater the phase difference between the first sound source AS1 and the second sound source AS2 is required. Similarly, when the frequencies are the same, the phase difference between the first sound source AS1 and the second sound source AS2 may be negatively correlated with the distance between the two sound sources. The greater the distance, the smaller the phase difference between the first sound source AS1 and the second sound source AS2 is required; and the smaller the distance, the greater the phase difference between the first sound source AS1 and the second sound source AS2 is required. It should be understood that in actual measurements when the phase difference is negatively correlated with the magnitude of a plurality of consecutive frequencies within a certain frequency range and/or a plurality of consecutive distances within a distance range of a certain dual-sound source, it may be considered that the phase difference is negatively correlated with the magnitude of the frequency and/or the magnitude of the distance between the two sound sources. Merely as an example, a plurality of (e.g., 5, 10, etc.) frequencies and their corresponding phase differences may be measured at equal step frequencies (e.g., every 1 Hz, 10 Hz, 50 Hz, 100 Hz, 200 Hz, etc.). When the plurality of frequencies and their corresponding phase differences satisfy a negative correlation, the phase differences may be considered to be negatively correlated with the frequency.

In practical applications, the distance l is typically fixed, and the correspondence between the phase difference (p and kl may be simplified as a correspondence between the frequency and the phase difference. That is to say, under the premise that the distance l is fixed, when the phase difference between the first sound source AS1 and the second sound source AS2 and the frequency satisfy a certain correspondence, a cardioid directional radiating sound field may be formed between the first sound source AS1 and the second sound source AS2. As an illustrative example, when the distance l is 3 mm as shown in the table below, in order to enable the first sound source AS1 and the second sound source AS2 to form a cardioid directional radiating sound field, the table of correspondence of the required phase difference φ (which is also understood as an optimal phase difference for realizing the cardioid directional radiating sound field) and the frequency f may be as follows:

| Frequency f | 200 Hz | 500 Hz | 1000 Hz | 2000 Hz |
|---|---|---|---|---|
| Phase difference φ | 179° | 178° | 176° | 173° |

From the table, it can be seen that at different frequencies, the required phase differences between the first sound source AS1 and the second sound source AS2 are different for the first sound source AS1 and the second sound source AS2 to form a cardioid directional radiating sound field. At the same time, the table also shows that even though the phase differences p corresponding to different frequencies are different, the differences are not significant. For example, the table shows that 200 Hz corresponds to a phase difference of 179°, and 2000 Hz corresponds to a phase difference of 173°, resulting in a difference of only 6° between the two. Therefore, when a fixed phase difference φ (such as 176°) or a range of phase differences (such as 120° to 179°) is determined, within a wide frequency range (such as 200 Hz to 2000 Hz), even though the cardioid directional radiating sound field (shown in FIG. 3A) may not be formed at certain frequencies, a cardioid-like directional radiating sound field may be formed, such as the hypercardioid directional radiating sound field shown in FIG. 3B.

Figure 6:
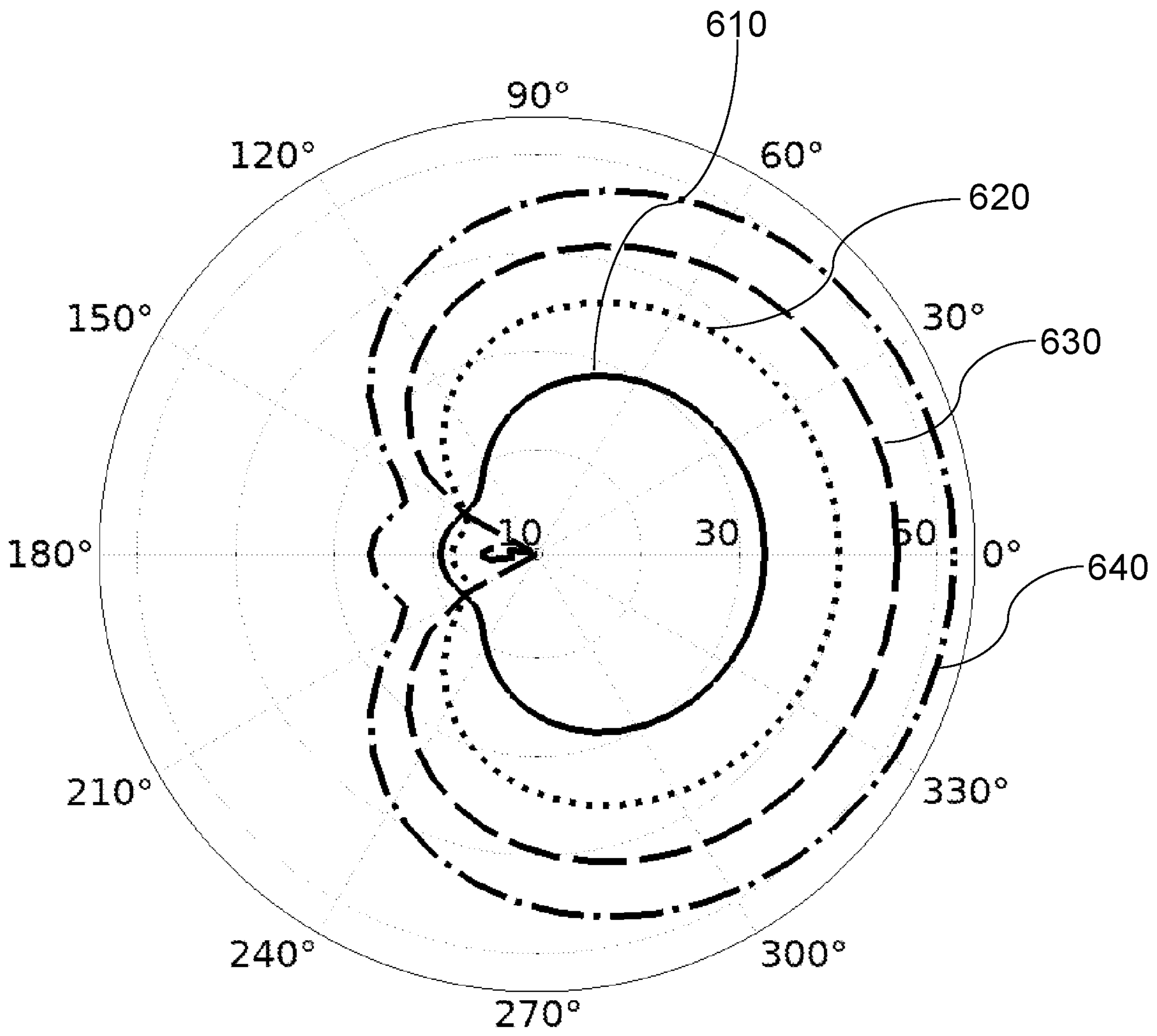
FIG. 6 is a schematic diagram illustrating exemplary directional radiating sound fields at different frequencies according to some embodiments of the present disclosure.

FIG. 6 is a schematic diagram illustrating exemplary directional radiating sound fields at different frequencies according to some embodiments of the present disclosure. It should be noted that FIG. 6 corresponds to sound field radiation corresponding to different frequencies in a far field at a distance of 0.5 m from a sound source when the distance l=3 mm and the phase difference φ=176°. As shown in FIG. 6, a curve 610, a curve 620, a curve 630, and a curve 640 represent curves of directional radiating sound fields corresponding to the frequencies of 200 Hz, 500 Hz, 1000 Hz, and 2000 Hz, respectively, in the far-field. As can be seen from FIG. 6, the intensity of the sound field in an opposite direction (180° direction) of a main lobe (with the greatest sound field intensity) of the radiating sound field of the curve 630 may be the smallest. Thus, the directivity (the cardioid directivity) of the radiating sound field of the curve 630 is optimal with respect to the other three curves (i.e., the directional radiating sound field is optimal when a phase difference φ=176° and a frequency of 1000 Hz). The intensities of the sound fields in the opposite direction of the main lobe of the radiating sound field corresponding to curves 610, 620, and 640 may be greater compared to that of the curve 630 which forms a cardioid-like directional radiating sound field. Therefore, it may be concluded that within a frequency range of 200 Hz to 2000 Hz, when the phase difference is φ=176°, both the two sound sources may form strong directional radiating sound fields. At the same time, combining the above description (the optimal phase differences corresponding to different frequencies do not vary much), it may be seen that when the phase difference is in a certain range, for example, 120°-179°, two sound sources may also form a strong directional radiating sound field within the frequency range of 200 Hz-2000 Hz.

The sound leakage reduction effect of the acoustic output device 100 in the far-field may be affected by a change rate of the phase difference of the sounds radiated from the sound sources in the near-field. The change rate of the phase difference may refer to a change rate of the phase difference between the sound radiated from the first acoustic hole and the sound radiated from the second acoustic hole with respect to the frequency. In some embodiments, the change rate of the phase difference may be expressed based on the phase difference and an octave. The octave (oct) refers to the spacing between two frequencies with a frequency ratio of 2 or ½ on a frequency response curve. For example, 1000 Hz-2000 Hz may be an octave, 2000 Hz-4000 Hz may be an octave, etc. As another example, 1500 Hz-3000 Hz may be an octave, and 3000 Hz-6000 Hz may be an octave, etc.

When the change rate of a near-field phase difference is controlled to show a slowly changing trend, the sounds radiated by the acoustic output device in the far-field can be prevented from distorting, so that the two sources tend to form a strong directional radiating sound field (for example, a cardioid or hypercardioid directional radiating sound field) in a wider range of frequencies. In some embodiments, in a frequency range of 1000 Hz-8000 Hz, the change rate of the phase difference between the sound radiated from the first acoustic hole and the sound radiated from the second acoustic hole may be less than 30°/oct.

In some embodiments, the change rate of the near-field phase difference may be less than 20°/oct in a frequency range of 1000 Hz-8000 Hz. By further controlling the change rate of the near-field phase difference, it may enable the two sound sources to further form a more standard strong directional radiating sound field (e.g., a cardioid or hypercardioid directional radiating sound field), which allows for less sound leakage in the opposite direction of the direction pointing to the ear canal, as well as in other directions, and thus allows for a better balance between the ear canal openness and the listening privacy.

Further, in some embodiments, in order to make the acoustic output device 100 to form a more standard strong directional radiating sound field in a range of 1000 Hz to 5000 Hz, the change rate of the near-field phase difference may be less than 25°/oct. In some embodiments, in order to make the acoustic output device 100 to form a more standard strong directional radiating sound field in a range of 3000 Hz-4000 Hz, the change rate of the near-field phase difference may be less than 20°/oct. In some embodiments, in order to make the acoustic output device 100 to form a more standard strong directional radiating sound field in a range of 2000 Hz-3000 Hz, the change rate of the near-field phase difference may be less than 15°/oct. In some embodiments, in order to make the acoustic output device 100 to form a more standard strong directional radiating sound field in a range of 1000 Hz-2000 Hz, the change rate of the near-field phase difference may be less than 10°/oct.

In some embodiments, an absolute value of a difference between the phase differences of the sound radiated from the first acoustic hole and the sound radiated from the second acoustic hole at 1000 Hz and a phase difference between the sound radiated from the first acoustic hole and the sound radiated from the second acoustic hole at 2000 Hz may be less than 30°. For example, the phase difference between the sound radiated from the first acoustic hole and the sound radiated from the second acoustic hole at 1000 Hz may be in a range of 159°-178°, and the phase difference between the sound radiated from the first acoustic hole and the sound radiated from the second acoustic hole at 2000 Hz may be in a range of 149°-176°. At this time, the absolute value of the difference between the phase differences of the sound radiated from the first acoustic hole and the sound radiated from the second acoustic hole at 1000 Hz and the phase difference between the sound radiated from the first acoustic hole and the sound radiated from the second acoustic hole at 2000 Hz may be in a range of 2°-29°, which is less than 30°. As the frequency range of 1000 Hz-2000 Hz is in a frequency range to which the human ear is more sensitive, in the frequency range, by controlling the absolute value of the difference between the phase differences of the sound radiated from the first acoustic hole and the sound radiated from the second acoustic hole at 1000 Hz and the phase difference between the sound radiated from the first acoustic hole and the sound radiated from the second acoustic hole at 2000 Hz to within 30°, the effect of the reducing the sound leakage in the far-field may be further improved.

In some embodiments, in order to make the far-field sound leakage of the acoustic output device 100 relatively small in a range of 200 Hz-5000 Hz, the far-field sound pressure level difference may be not less than 12 dB. At this time, the change rate of the near-field phase difference may be less than 29°/oct. In some embodiments, in order to make the far-field sound leakage of the acoustic output device 100 relatively small in a range of 500 Hz-4000 Hz, the far-field sound pressure level difference may be not less than 10 dB. At this time, the change rate of the near-field phase difference may be less than 25°/oct. In some embodiments, in order to make the far-field sound leakage of the acoustic output device 100 relatively small in a range of 1000 Hz-3000 Hz, the far-field sound pressure level difference may be not less than 6 dB. At this time, the change rate of the near-field phase difference may be less than 20°/oct. In some embodiments, in order to make the far-field sound leakage of the acoustic output device 100 relatively small in a range of 1500 Hz-2500 Hz, the far-field sound pressure level difference may be not less than 4 dB. At this time, the change rate of the near-field phase difference may be less than 15°/oct. In some embodiments, in order to make the far-field sound leakage of the acoustic output device 100 relatively small in a range of 1500 Hz-2000 Hz, the far-field sound pressure level difference may be not less than 3 dB. At this time, the change rate of the near-field phase difference may be less than 10°/oct.

Figure 7A:
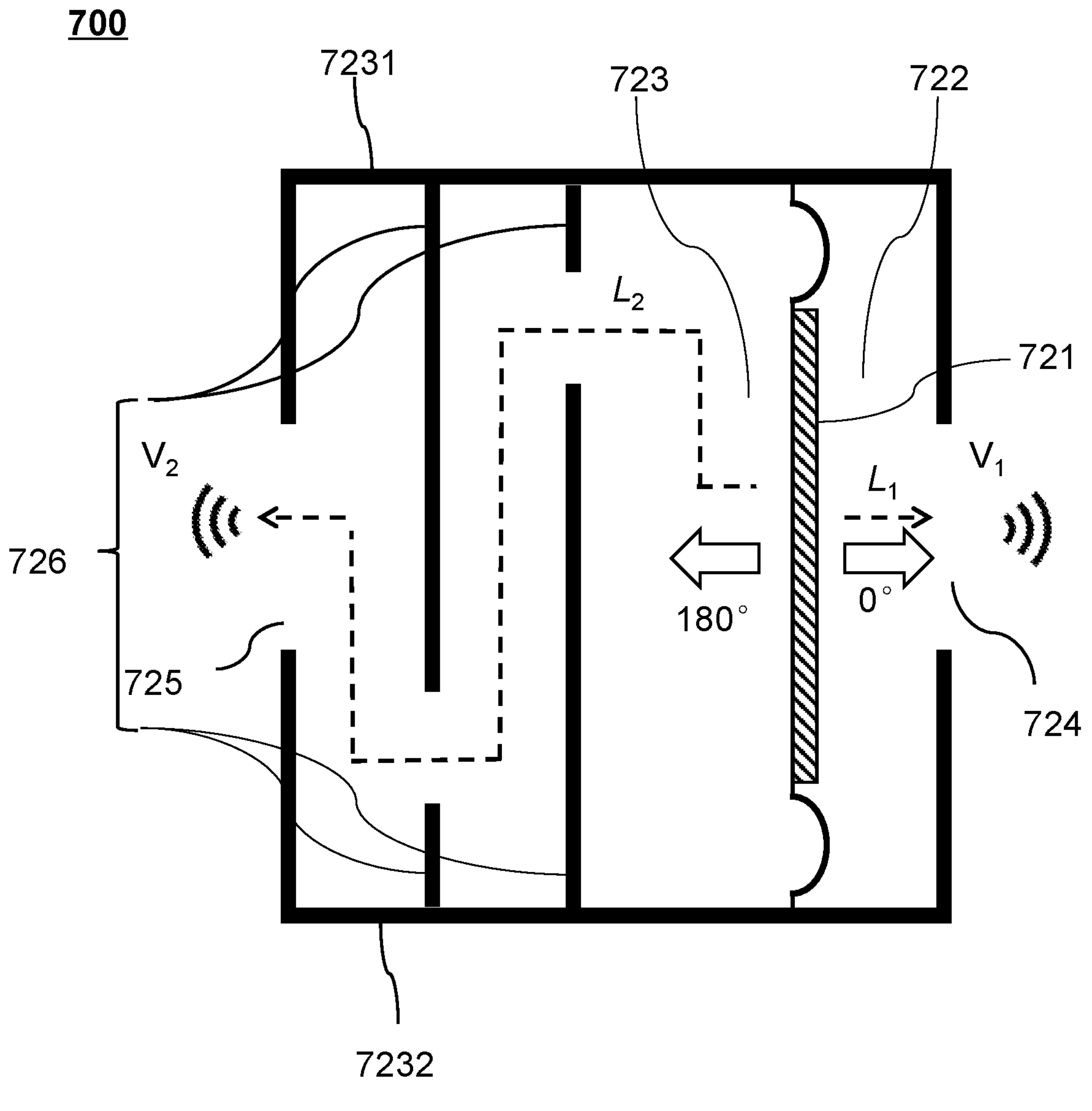
FIG. 7A is a schematic diagram illustrating an exemplary sound generation component according to some embodiments of the present disclosure.
Figure 7B:
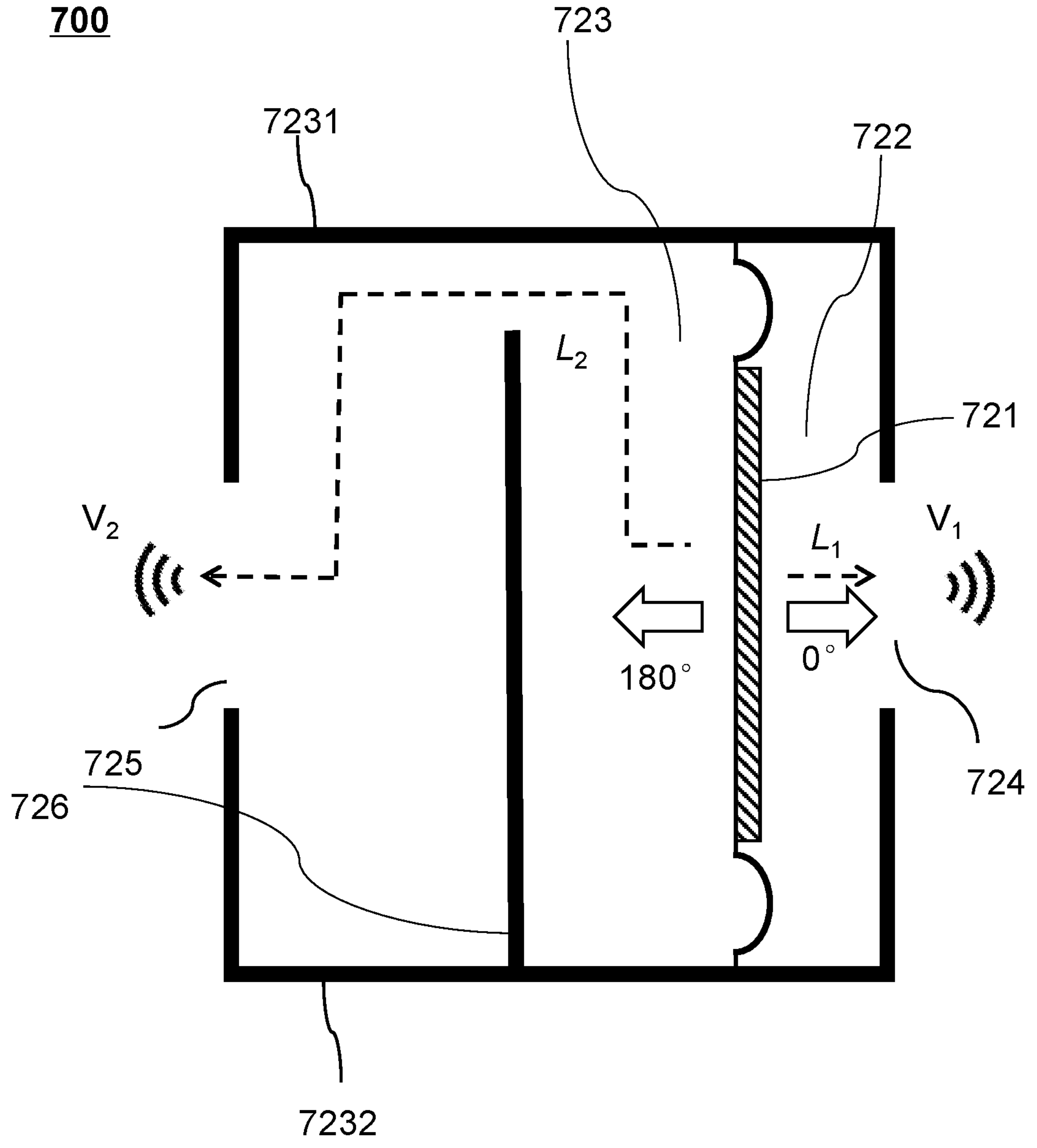
FIG. 7B is a schematic diagram illustrating an exemplary sound generation component according to some other embodiments of the present disclosure.
Figure 7C:
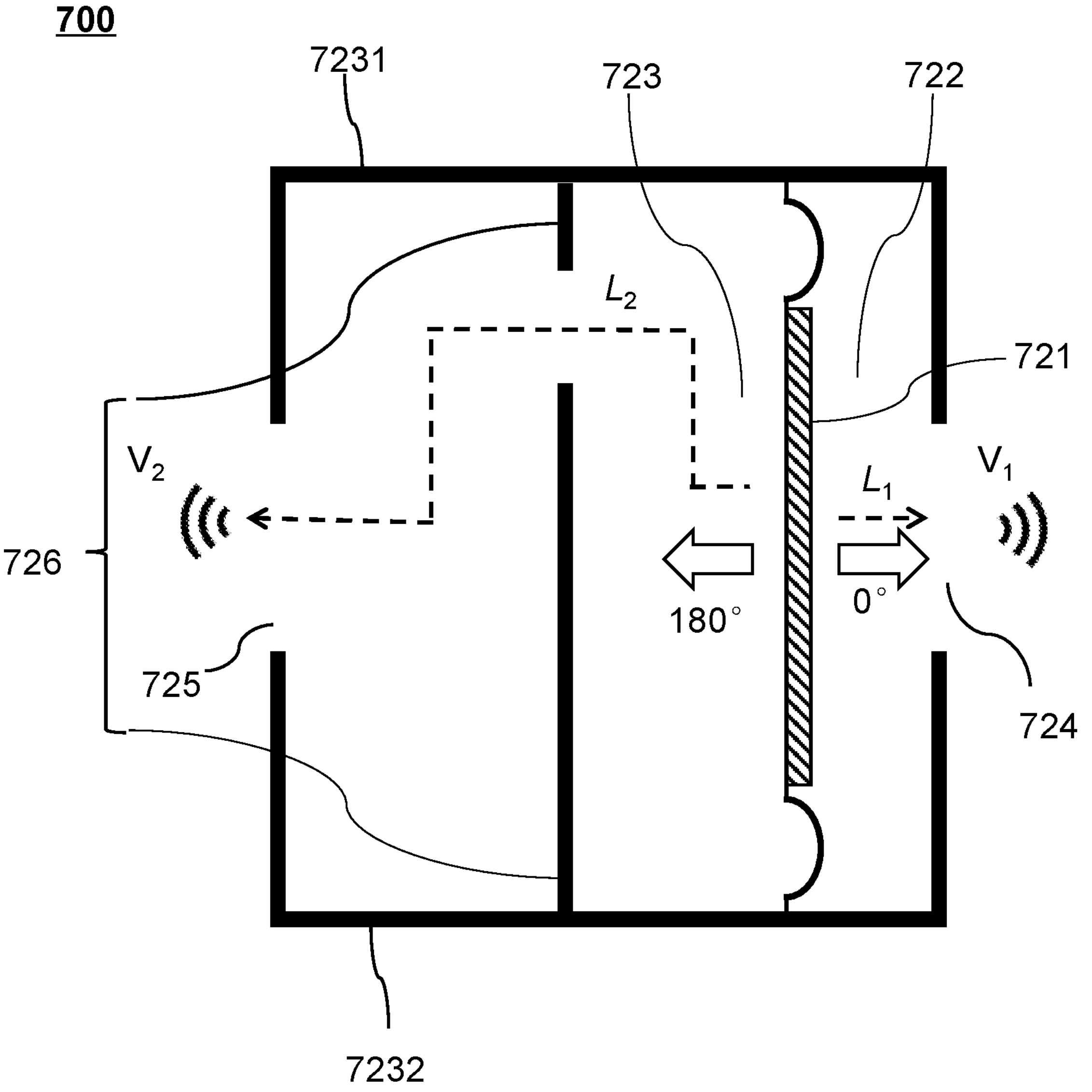
FIG. 7C is a schematic diagram illustrating an exemplary sound generation component according to some other embodiments of the present disclosure.

FIG. 7A is a schematic diagram illustrating an exemplary sound generation component according to some embodiments of the present disclosure. FIG. 7B is a schematic diagram illustrating an exemplary sound generation component according to some other embodiments of the present disclosure. FIG. 7C is a schematic diagram illustrating an exemplary sound generation component according to some other embodiments of the present disclosure.

As shown in FIG. 7A, a sound generation component 700 may include a first cavity 722 and a second cavity 723 acoustically coupled to at least one acoustic driver 721. In some embodiments, the at least one acoustic driver 721 may include a diaphragm, and the at least one acoustic driver 721 may has a front side and a rear side distinguished by the diaphragm. A sound may be radiated through the front side and the rear side to the first cavity 722 and the second cavity 723, respectively. In some embodiments, the at least one acoustic driver 721 may also include two acoustic drivers (i.e., the acoustic driver 721 in FIG. 7A may be replaced with two acoustic drivers). The two acoustic drivers may be driven by two groups of electrical signals so as to radiate sounds to the first cavity 722 and the second cavity 723, respectively. The sound within the first cavity 722 may be radiated to an outside environment through a first acoustic hole 724, i.e., the first acoustic hole 724 may radiate a first sound $V_1$ to the outside environment; the sound within the second cavity 723 may be radiated to the outside environment through a second acoustic hole 725 to the outside environment, i.e., the second acoustic hole 725 may radiate a second sound $V_2$ to the outside environment.

In some embodiments, in order to enable the sound radiated by the sound generation component 700 to the far-field within a target frequency band (e.g., 200 Hz-5000 Hz) to have strong directivity (e.g., a cardioid or hypercardioid pattern), it needs to enable the first sound $V_1$ radiated from the first acoustic hole 724 and the second sound $V_2$ radiated from the second acoustic hole 725 to have a phase difference within a specific range (e.g., 120°-179°). As an initial value of the phase difference between the two sound waves radiated by the acoustic driver 721 into the first cavity 722 and the second cavity 723, respectively is 180°, an acoustic structure inside the first cavity 722 and/or the second cavity 723 may be set, so that the phase difference between the first sound $V_1$ and the second sound $V_2$ satisfies a condition. In some embodiments, the sound generation component 700 may include an acoustic structure 726 disposed within the first cavity 722 and/or the second cavity 723. The acoustic structure 726 may be used to regulate an actual output phase of the first sound $V_1$ and/or the second sound $V_2$, thereby adjusting the phase difference between the first sound $V_1$ and the second sound $V_2$. In some embodiments, the acoustic structure 726 may make a first sound path of the first sound $V_1$ propagated in the first cavity 722 and a second sound path of the second sound $V_2$ propagated in the second cavity 723 have a sound path difference, thereby changing the phase difference between the first sound $V_1$ radiated from the first acoustic hole 724 and the second sound $V_2$ radiated from the second acoustic hole 725. The present embodiment is illustrated with the example of the acoustic structure 726 being disposed in the second cavity 723. It may be appreciated that in other alternative embodiments, the acoustic structure 726 may also be disposed in the first cavity 722, or different acoustic structures may be disposed in the first cavity 722 and the second cavity 723.

In some embodiments, the acoustic structure 726 may include a baffle, one end of the baffle may be connected to an inner wall of the second cavity 723, and the other end of the baffle may be a free end. In some embodiments, as shown in FIG. 7A, four baffles may be disposed in the second cavity 723, with two baffles being disposed on a first inner wall 7231 of the second cavity 723, and the remaining two baffles being disposed on a second inner wall 7232 (the second inner wall 7232 may be disposed opposite to the first inner wall 7231). The free ends of the baffles on the two inner walls may be disposed opposite to each other. At this time, the free ends of the two baffles disposed opposite to each other may have a gap between them, and the sound may be able to bypass the baffles and pass through the gap to the second acoustic hole 725. In some embodiments, a number and/or position of the baffles in the second cavity 723 may also be disposed in other ways. For example, as shown in FIG. 7B, the baffle may be disposed on only one inner wall (e.g., the second inner wall 7232) of the second cavity 723. One end of the baffle may be connected to the second inner wall 7232, and the free end of the baffle may extend to the vicinity of the first inner wall 7231 (a gap may be formed between the free end of the baffle and the first inner wall 7231). The sound may be able to bypass the baffle and pass through the gap between the free end of the baffle and the first inner wall 7231 to the second acoustic hole 725. As another example, as shown in FIG. 7C, the two ends of the baffle may be connected to the first inner wall 7231 and the second inner wall 7232, respectively. At this time, a hole may be opened on the baffle, and the sound may be able to bypass the baffle and pass through the hole to the second acoustic hole 725. During the process of the sound bypassing the baffle to the second acoustic hole 725, a distance traveled by the sound (i.e., the sound path) may be altered with respect to the distance traveled by the sound when the baffle is not disposed. The sound wave radiated from the front side of the acoustic driver 721 may be radiated outward from the first acoustic hole 724 through the first cavity 722, and a distance traveled by the sound may be the first sound path $L_1$. The sound wave radiated from the rear side of the acoustic driver 721 may be radiated outward from the second acoustic hole 725 through the second cavity 723 and the acoustic structure 726, and a distance traveled by the sound wave may be the second sound path $L_2$. There may be a sound path difference between the first sound path $L_1$ and the second sound path $L_2$.

A time delay of the phase difference between the first sound $V_1$ radiated from the first acoustic hole 724 and the second sound $V_2$ radiated from the second acoustic hole 725 may be:

$$\Delta\tau = \frac{L_2 - L_1}{c}, \tag{9}$$

where c indicates a sound speed. Thus, the phase difference φ between the first sound $V_1$ and the second sound $V_2$ may be:

$$\varphi = 180° - 2\pi f \cdot \Delta\tau. \tag{10}$$

As can be seen, an actual output phase difference between the first sound $V_1$ and the second sound $V_2$ may be controlled by controlling the sound path difference (e.g., the sound path difference may be in a range between 1 mm and 57 mm) between the first sound path $L_1$ and the second sound path $L_2$, so that the phase difference between the first sound $V_1$ and the second sound $V_2$ lies in a range of 120°-179°, which in turn enables the sound radiated by the sound generation component 700 to the far-field to have strong directivity (e.g., cardioid or hypercardioid).

It should be understood that a number, a position, a size, and a disposing manner, etc., of the baffle, may affect the second sound path $L_2$ that the sound wave travels in the second cavity 723, and thus the phase difference between the first sound $V_1$ and the second sound $V_2$ may be affected. Therefore, the number, the position, the size, and the disposing manner, etc., of the baffle may be reasonably disposed according to a requirement for the phase difference between the first sound $V_1$ and the second sound $V_2$.

Furthermore, it may be seen in this embodiment that the phase difference between the first sound $V_1$ and the second sound $V_2$ may be negatively correlated with the frequency under a condition that other parameters (e.g., the first sound path, the second path) are the same. The higher the frequency, the smaller the phase difference between the first sound $V_1$ and the second sound $V_2$; and the lower the frequency, the greater the phase difference between the first sound $V_1$ and the second sound $V_2$.

Figure 8:
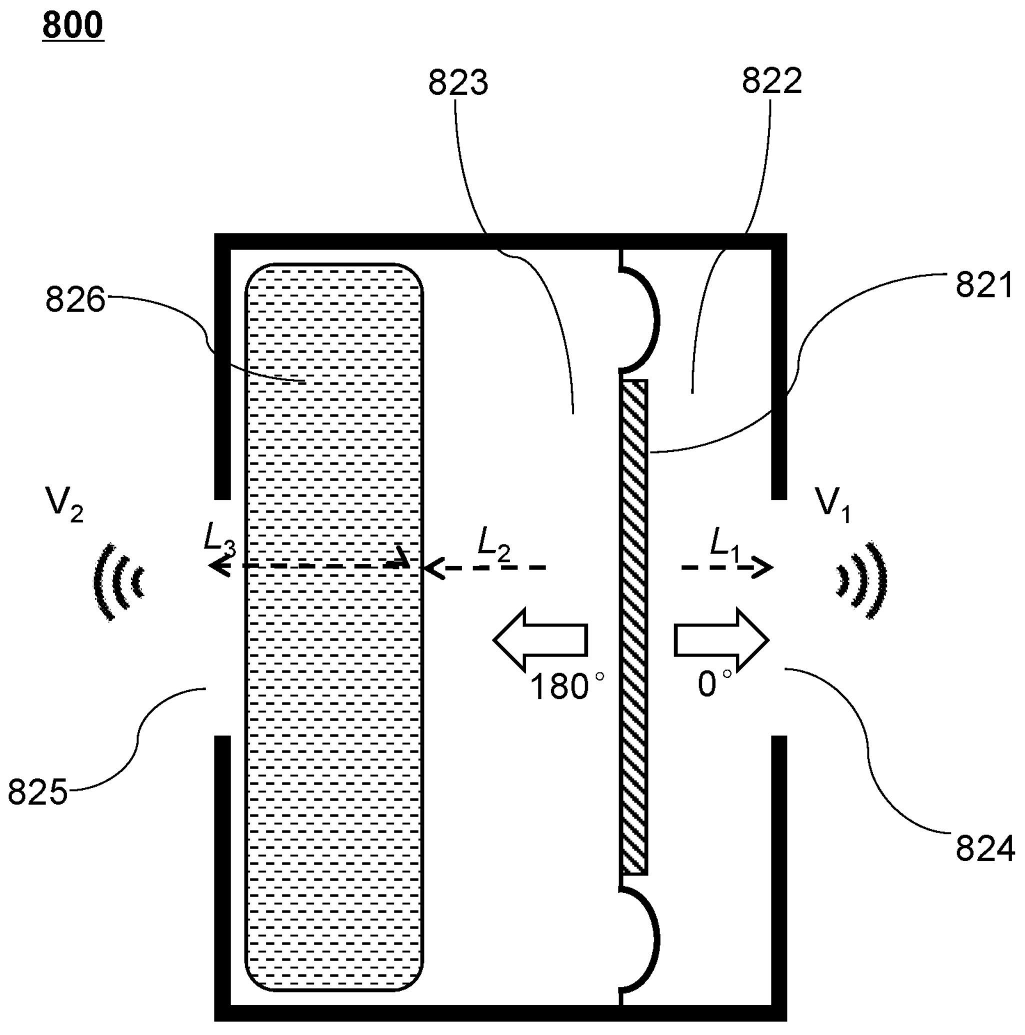
FIG. 8 is a schematic diagram illustrating another exemplary sound generation component according to some other embodiments of the present disclosure.

FIG. 8 is a schematic diagram illustrating another exemplary sound generation component according to some other embodiments of the present disclosure.

As shown in FIG. 8, an acoustic structure that alters a speed of sound propagation may be disposed within a first cavity 822 and/or a second cavity 823 of a sound generation component 800. For example, the acoustic structure may be a slow speed acoustic structure that is able to slow down the sound propagation inside the structure. The speed of sound propagation in air is faster than the speed of sound propagation in the slow speed acoustic structure. In some embodiments, the slow speed acoustic structure may include an acoustic gauze, an acoustic porous material, etc., or any combination thereof. When the sound waves pass through micropores of the gauze or the porous material, due to a viscous effect of the micropores on the air, the speed of the sound wave may slow down when passing through the micropores, thus achieving a slow down effect. Specifically, if the speed of sound propagation in the air (also known as the normal sound speed) is c, and the speed of sound propagation in the slow speed acoustic structure (also known as an equivalent speed of sound) is c', as described above, c'<c. Therefore, by disposing the slow speed acoustic structure in the cavity to change the speed of sound propagation, the actual output phase of the first sound $V_1$ and/or the actual output phase of the second sound $V_2$ may be regulated, thereby regulating the phase difference between the first sound $V_1$ and the second sound $V_2$.

The present embodiment is illustrated with a slow speed acoustic structure 826 being disposed in the second cavity 823. As shown in FIG. 8, the second cavity 823 may be disposed with the slow speed acoustic structure 826, the sound wave radiated by the front side of the acoustic driver 821 may radiate outward from the first acoustic hole 824, and the path traveled by the sound wave is the first sound path $L_1$. The sound wave radiated from the rear side of the acoustic driver 821 may radiate outward from the second acoustic hole 825, and the path traveled by the sound wave may include the second sound path $L_2$ that is propagated through the air, and a third sound path $L_3$ that is propagated through the slow speed acoustic structure 826.

A time delay of the phase difference between the first sound $V_1$ radiated from the first acoustic hole 824 and the second sound $V_2$ radiated from the second acoustic hole 825 may be:

$$\Delta\tau = \left(\frac{L_2}{c} + \frac{L_3}{c'}\right) - \frac{L_1}{c}, \tag{11}$$

where c indicates the normal sound speed and c' indicates the equivalent sound speed in the slow speed acoustic structure 826. Thus, the phase difference φ between the first sound $V_1$ and the second sound $V_2$ may be:

$$\varphi = 180° - 2\pi f \cdot \Delta\tau. \tag{12}$$

As may be seen therefrom, the equivalent sound speed and/or the third sound path $L_3$ of the sound wave propagating in the slow speed acoustic structure 826 may be controlled (e.g., a ratio of the equivalent sound speed in the slow speed acoustic structure to the normal sound speed may be controlled to be within a range of 0.02 to 0.5), so as to control the actual output phase difference between the first sound $V_1$ and the second sound $V_2$, thereby making the phase difference between the first sound $V_1$ and the second sound $V_2$ lie in a range of 120°-179°, which in turn enables the sound radiated by the sound generation component 800 to the far-field to have strong directivity (e.g., a cardioid or hypercardioid shape).

Furthermore, it may be seen in this embodiment that the phase difference between the first sound $V_1$ and the second sound $V_2$ may be negatively correlated with the frequency under a condition that other parameters (e.g., the equivalent sound speed, the first sound path, the second sound path, and the third sound path) are the same. The higher the frequency, the smaller the phase difference between the first sound $V_1$ and the second sound $V_2$; and the lower the frequency, the greater the phase difference between the first sound $V_1$ and the second sound $V_2$.

Figure 9:
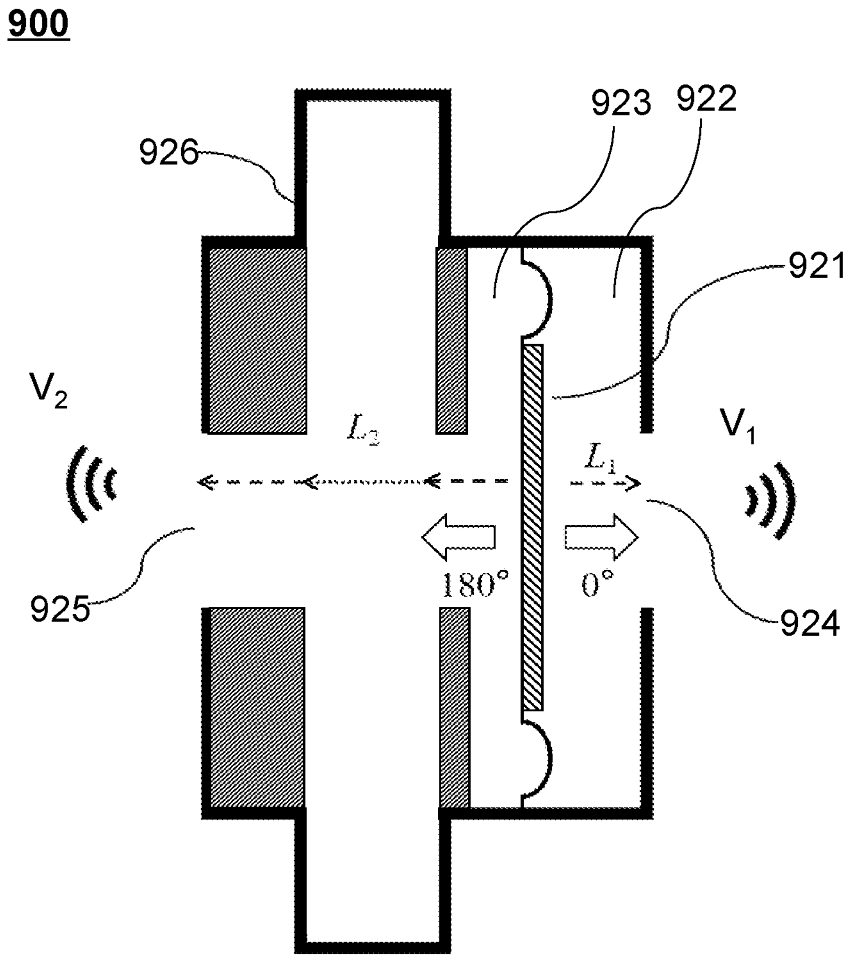
FIG. 9 is a schematic diagram illustrating another exemplary sound generation component according to some other embodiments of the present disclosure.

FIG. 9 is a schematic diagram illustrating another exemplary sound generation component according to some other embodiments of the present disclosure.

As shown in FIG. 9, an expansion acoustic structure 926 may be disposed within a first cavity 922 and/or a second cavity 923 of a sound generation component 900. The expansion acoustic structure 926 may change (e.g., expand) a cross-sectional area of the first cavity 922 or the second cavity 923 at different positions along a sound transmission path. When a sound wave propagates in a waveguide (i.e., an air waveguide formed by the first cavity 922 or the second cavity 923), if the cross-sectional area of the waveguide at different positions along the sound transmission path of the sound wave changes, the sound waves can be reflected at a location of an abrupt change in a cross-sectional area, which means that an equivalent impedance of the medium has changed. Correspondingly, parameters related to the equivalent impedance (such as an equivalent sound speed, an equivalent density, etc.) may also change accordingly, resulting in a change in the phases of the sound waves. For example, an effect of the expansion acoustic structure 926 on the change of the equivalent sound speed may be primarily related to a ratio of a cross-sectional area of the second cavity 923 after expanded by the expansion acoustic structure 926 to an original cross-sectional area of the second cavity 923. In some embodiments, the actual equivalent sound speed may be obtained by means of simulation or experimental testing, etc.

In this embodiment, the expansion acoustic structure 926 being disposed in the second cavity 923 may be taken as an example for illustration. As shown in FIG. 9, the expansion acoustic structure 926 may be disposed on two opposite side walls of the second cavity 923, and the expansion acoustic structure 926 may make an abrupt change in the cross-sectional area of the second cavity 923 before and after a particular position on the sound transmission path. In some embodiments, the expansion acoustic structure 926 may be an expansion cavity. A structural shape of the expansion cavity may be a rectangular shape as shown in FIG. 9, and in other embodiments, the cross-sectional area of the expansion acoustic structure 926 may have other shapes, such as, a triangle, a trapezoid, etc. The structural shape of the expansion cavity may be reasonably disposed according to the phase difference between the first sound $V_1$ and the second sound $V_2$.

As shown in FIG. 9, the sound wave radiated at a front side of the acoustic driver 921 may be radiated to the outside environment from the first acoustic hole 924, and a path traveled by the sound wave may be the first sound path $L_1$, and the sound wave radiated at a rear side of the acoustic driver 921 may be radiated to the outside environment through the expansion acoustic structure 926 and the second cavity 923 from the second acoustic hole 925, and the path traveled by the sound wave may be the second sound path $L_2$. The sound speed in the first sound path $L_1$ may be the normal sound speed c, and the sound speed in the second sound path $L_2$ may be the equivalent sound speed c'. A time delay of the phase difference between the first sound $V_1$ radiated from the first acoustic hole 924 and the second sound radiated from the second acoustic hole 925 may be:

$$\Delta\tau = \frac{L_2}{c'} - \frac{L_1}{c}, \tag{13}$$

where c indicates the normal sound speed, and c' indicates the equivalent sound speed in the expansion acoustic structure 926. Thus, the phase difference φ between the first sound $V_1$ and the second sound $V_2$ may be:

$$\varphi = 180° - 2\pi f \cdot \Delta\tau. \tag{14}$$

As may be seen that the actual output phase difference between the first sound $V_1$ and the second sound $V_2$ may be controlled by disposing the expansion acoustic structure 926 in the cavity to control the equivalent sound speed of the sound wave propagating in the cavity. As a result, the phase difference between the first sound $V_1$ and the second sound $V_2$ may be between 120° and 179°, which in turn enables the sound radiating from the sound generation component 900 to the far-field to have strong directivity (e.g., cardioid or hypercardioid).

Furthermore, it may be seen in this embodiment that the phase difference between the first sound $V_1$ and the second sound $V_2$ may be negatively correlated with the frequency under a condition that the other parameters (e.g., the first sound path, the second sound path, and the equivalent sound speed) are the same. The higher the frequency, the smaller the phase difference between the first sound $V_1$ and the second sound $V_2$; and the lower the frequency, the greater the phase difference between the first sound $V_1$ and the second sound $V_2$.

Figure 10A:
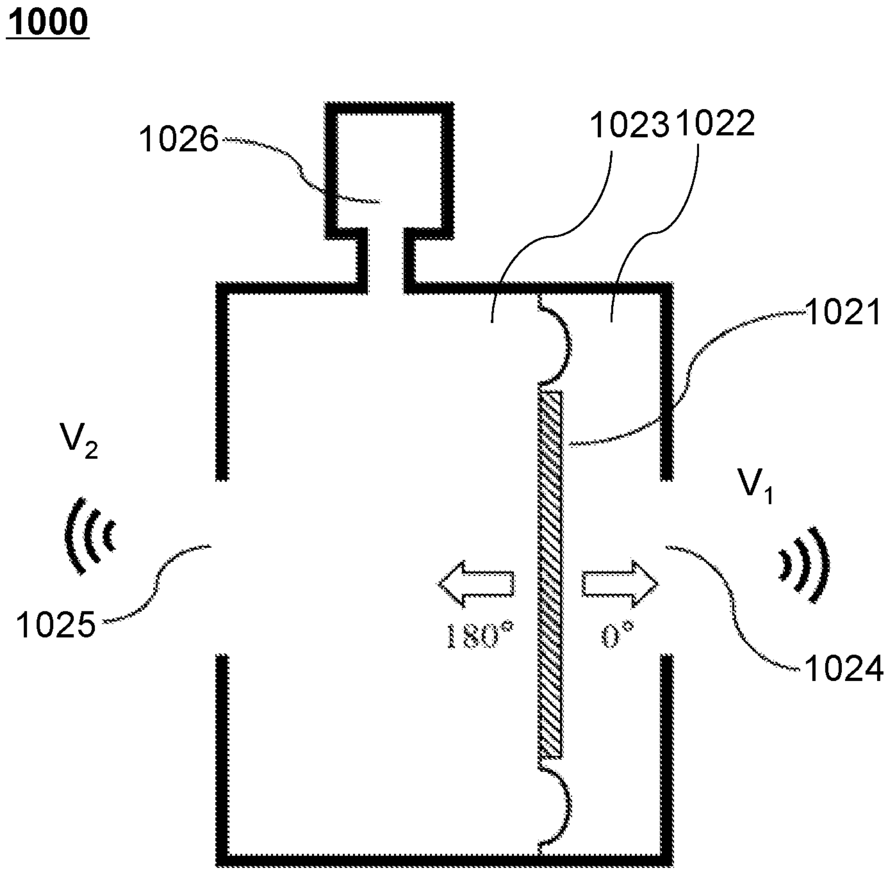
FIG. 10A is a schematic diagram illustrating another exemplary sound generation component according to some embodiments of the present disclosure.

FIG. 10A is a schematic diagram illustrating another exemplary sound generation component according to some embodiments of the present disclosure.

A structure of a sound generation component 1000 shown in FIG. 10A may be similar to the structure of the sound generation component 700 shown in FIG. 7A. For example, the sound generation component 1000 may include at least one acoustic driver 1021, a first cavity 1022, and a second cavity 1023. The first cavity 1022 may be provided with at least one first acoustic hole 1024, and the second cavity 1023 may be provided with at least one second acoustic hole 1025. For specific contents on the acoustic driver 1021, the first cavity 1022, the second cavity 1023, the first acoustic hole 1024, and the second acoustic hole 1025, please refer to the related descriptions of FIG. 7A. The sound generation component 1000 differs from the sound generation component 700 in a difference in acoustic structure. As shown in FIG. 10A, a sound absorption structure 1026 may be disposed within the first cavity 1022 and/or the second cavity 1023 of the sound generation component 1000. In some embodiments, the sound absorption structure 1026 may have a resonance frequency. Regulating (e.g., a phase regulation) of the sound near the resonance frequency of the sound absorption structure 1026 may be utilized as a way to control the actual output phase difference between the two sound waves. In some embodiments, the sound absorption structure 1026 may be a Helmholtz resonator. In some embodiments, the sound absorption structure 1026 may be a microperforated plate resonator. In some embodiments, the sound absorption structure 1026 may be a ¼ wavelength pipe resonator.

In this embodiment, the sound absorption structure 1026 being disposed in the second cavity 1023 may be taken as an example for illustration. The sound absorption structure 1026 may be disposed on the side wall of the second cavity 1023 and may be acoustically connected with the second cavity 1023. Taking the Helmholtz resonator as an example, a resonance frequency f0 of the Helmholtz resonator may be:

$$f_0 = \frac{1}{2\pi}\sqrt{\frac{1}{MC}}, \tag{15}$$

where M indicates a sound mass (mainly related to nozzle parameters of the Helmholtz resonator), and C indicates an acoustic capacitance (mainly related to cavity parameters at a rear end of the Helmholtz resonator).

Figure 10B:
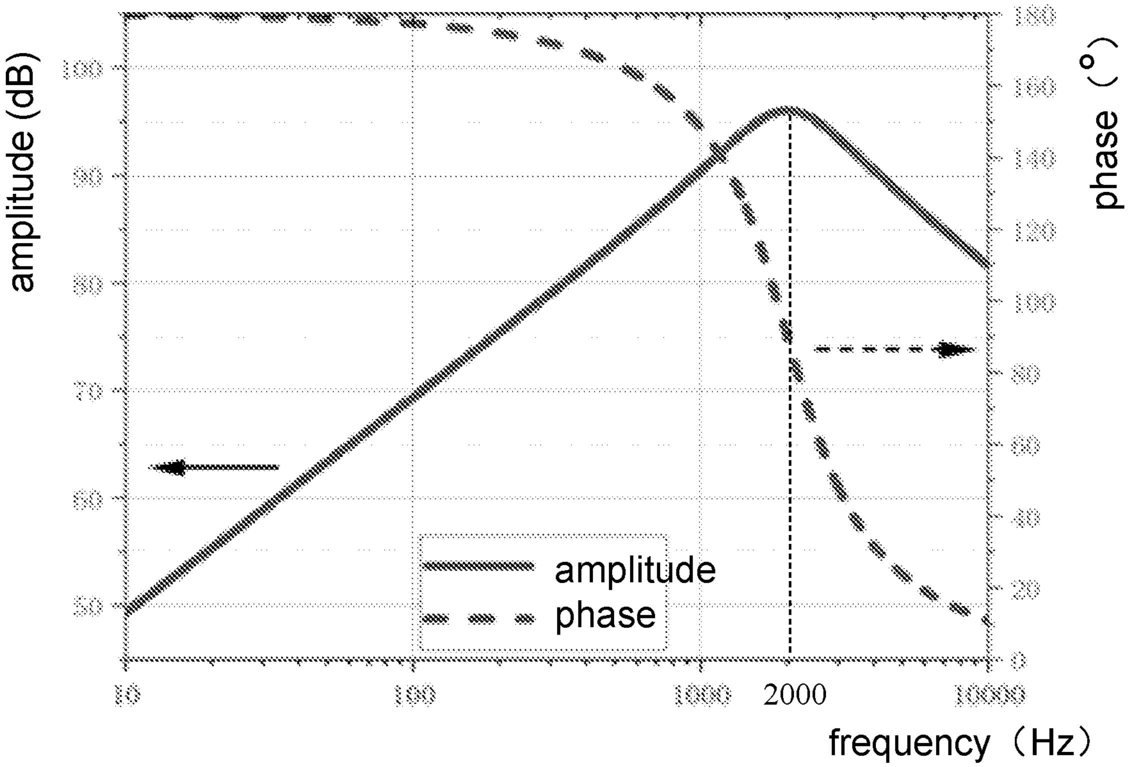
FIG. 10B is a schematic diagram illustrating a frequency response of a Helmholtz resonator.

FIG. 10B is a schematic diagram illustrating a frequency response of a Helmholtz resonator.

The horizontal axis indicates frequency in Hz, and the vertical axis indicates amplitude response (in dB) or phase response (in ° (deg)). The solid line indicates the amplitude response of the frequency response, and the dotted line indicates the phase response of the frequency response. As shown in FIG. 10B, when the resonance frequency of the Helmholtz resonator is f0=2000 Hz, the amplitude response may have a resonance peak at 2000 Hz, and the phase response is near 2000 Hz and gradually changes from 180° to approaching to 0° as the frequency increases. Therefore, within a low-frequency range (e.g., between 40 Hz and 1000 Hz), a phase difference varies within a range of 179° to 150°, which essentially satisfies the phase difference requirement for achieving the cardioid or hypercardioid directivity described in the embodiments of the present disclosure. Thus, the actual output phase difference between the first sound and the second sound may be controlled by disposing the sound absorption structure 1026 in the cavity to regulate the phase of the sound radiated from the acoustic hole of the cavity. As a result, the sound radiated by the sound generation component 900 to the far-field may have strong directivity (e.g., cardioid or hypercardioid).

In some embodiments, when the at least one acoustic driver of the sound generation component is a single driver or includes two acoustic drivers, the phase difference between the first sound $V_1$ and the second sound $V_2$ may be adjusted utilizing the mode described in FIGS. 7A-10A. In these regulation modes, the phase difference between the sounds radiated by the acoustic driver to the first cavity and the second cavity may be 180°. By providing different types of acoustic structures (e.g., a baffle, a slow speed acoustic structure, an expansion acoustic structure, a sound absorption structure) in the cavity, the phase of the first sound $V_1$ or the second sound $V_2$ may be changed, thereby realizing the adjustment of the phase difference between the first sound $V_1$ and the second sound $V_2$. In some embodiments, when the at least one acoustic driver includes two acoustic drivers, the first sound $V_1$ and the second sound $V_2$ may further be regulated by regulating electrical driving signals corresponding to the two acoustic drivers. In some embodiments, the phases of two electrical driving signals may be respectively disposed, so that the phase of the sound radiated by one acoustic driver to the first cavity is not completely opposite to the phase of the sound radiated by the other acoustic driver to the second cavity.

Figure 11:
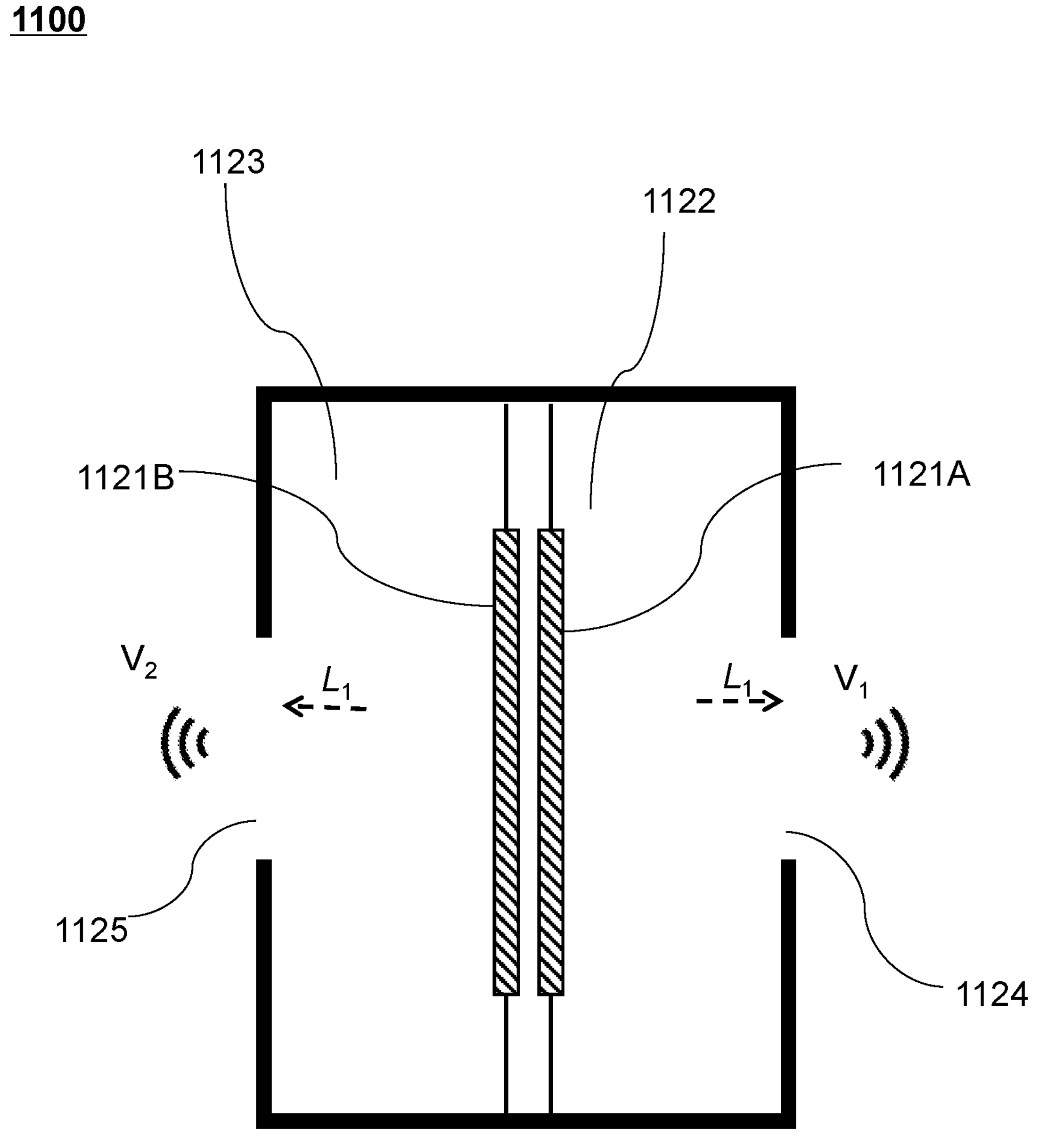
FIG. 11 is a diagram illustrating an exemplary structure of a sound generation component with two acoustic drivers according to some embodiments of the present disclosure.
Figure 12:
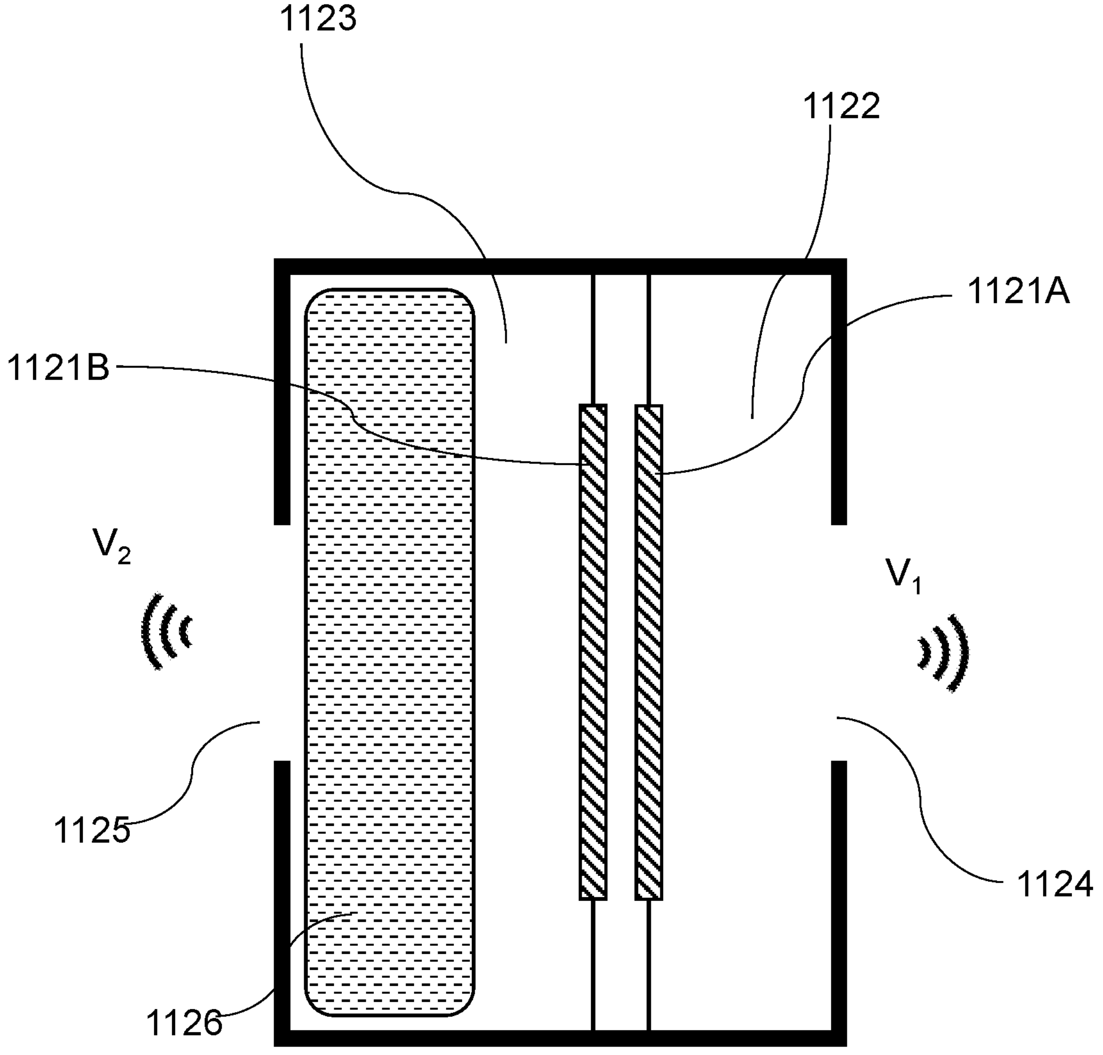
FIG. 12 is a diagram illustrating an exemplary structure of a sound generation component with two acoustic drivers according to some other embodiments of the present disclosure.

FIG. 11 is a diagram illustrating an exemplary structure of a sound generation component with two acoustic drivers according to some embodiments of the present disclosure. FIG. 12 is a diagram illustrating an exemplary structure of a sound generation component with two acoustic drivers according to some other embodiments of the present disclosure.

As shown in FIG. 11, a sound generation component 1100 may include a first acoustic driver 1121A, a second acoustic driver 1121B, a first cavity 1122, and a second cavity 1123. A first acoustic hole 1124 may be disposed on the first cavity 1122, and the first acoustic driver 1121A may radiate a first sound $V_1$ to an outside environment through the first cavity 1122 and the first acoustic hole 1124. A second acoustic hole 1125 may be disposed on the second cavity body 1123, and the second acoustic driver 1121B may radiate a second sound $V_2$ to the outside environment through the second cavity 1123 and the second acoustic hole 1125. In some embodiments, the first acoustic driver 1121A and the second acoustic driver 1121B may be driven by two groups of electrical driving signals, and by setting phases of the two groups of electrical driving signals to be different, a phase difference between the first sound $V_1$ and the second sound $V_2$ may be made to lie in a range of 120°-179°. For example, as shown in FIG. 11, the electrical driving signal driving the first acoustic driver 1121A and the electrical driving signal driving the second acoustic driver 1121B may be disposed so that a phase difference between the electrical driving signal driving the first acoustic driver 1121A and the electrical driving signal driving the second acoustic driver 1121AB lies between 120° and 179°. In this way, no other acoustic structure may be disposed in the first cavity 1122 and the second cavity 1123, and sound paths of the sound propagation in the respective cavities are approximately the same, so as to realize that the phase difference between the first sound $V_1$ and the second sound $V_2$ is 120°-179°. As another example, as shown in FIG. 12, the phase difference between the electrical driving signal driving the first acoustic driver 1121A and the electrical driving signal driving the second acoustic driver 1121B may be set to be not located between 120° and 179°. In this way, by setting the acoustic structure (e.g., as shown in FIG. 12, a slow speed acoustic structure 1126 may be disposed in the second cavity 1123) in the first cavity 1122 and/or the second cavity 1123, the phase difference between the first sound $V_1$ and the second sound $V_2$ may be made to be between 120° and 179°.

Beneficial effects that may be brought about by the acoustic output device described in the embodiments of the present disclosure may include, but are not limited to: (1) by regulating the phase difference between the two sounds generated by the sound generation component to make the near-field sound pressure level difference between the first acoustic hole and the second acoustic hole relatively small and the far-field sound pressure level difference relatively great, the sound radiated by the acoustic output device to the far-field may have stronger directivity in the target frequency band, so that the sound volume in the direction of the ear canal opening is maximized when the listener wears the acoustic output device, and the sound leakage in the direction opposite to the ear canal opening of the listener as well as the sound leakage in the other directions may be relatively small, which in turn better balances the openness of the ear canal and the listening privacy; (2) by disposing various acoustic structures (e.g., a baffle, a slow speed acoustic structure, an expansion acoustic structure, and a sound absorption structure) in the sound generation component of the acoustic output device to regulate the phase difference between the two sounds generated by the sound generation component, the regulation of the phase difference may be more flexible and precise, thereby improving a practicality of the acoustic output device; (3) when the at least one acoustic driver in the sound generation component includes two acoustic drivers, by directly regulating the two electrical driving signals to implement the regulation of the phase difference between two sounds, the structure of the acoustic output device can be made simpler and less costly.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. These types of modifications, improvements, and amendments are suggested in the present disclosure, so these types of modifications, improvements, and amendments are still within the spirit and scope of the exemplary embodiments thereof.

What is claimed is:

1. An acoustic output device comprising:

at least one acoustic driver; and a first cavity and a second cavity acoustically coupled to opposite sides of the at least one acoustic driver, respectively, the first cavity being provided with a first acoustic hole, the second cavity being provided with a second acoustic hole, and the at least one acoustic driver radiating sounds with a phase difference to an outside environment through the first acoustic hole and the second acoustic hole, wherein within a target frequency band, a near-field sound radiated from the first acoustic hole and a near-field sound radiated from the second acoustic hole have a near-field sound pressure level difference, the near-field sound pressure level difference being less than 6 dB; and within the target frequency band, the sound radiated by the acoustic output device to a far-field has directivity, which is manifested in that the sounds radiated from the first acoustic hole and the second acoustic hole have a far-field sound pressure level difference of not less than 3 dB in at least one pair of opposite directions, wherein a difference between acoustic loads of the first acoustic hole and the second acoustic hole is less than 0.15.

2. The acoustic output device of claim 1, wherein the target frequency band is 200 Hz-5000 Hz.

3. The acoustic output device of claim 1, wherein the near-field sound pressure level difference is less than 3 dB, and/or, the far-field sound pressure level difference is not less than 6 dB.

4. The acoustic output device of claim 1, wherein in a frequency range of 1 kHz-8 KHz, a change rate of the phase difference is less than 30°/oct.

5. The acoustic output device of claim 1, wherein in a frequency range of 1 kHz-8 KHz, a change rate of the phase difference is less than 20°/oct.

6. The acoustic output device of claim 4, wherein an absolute value of a difference between the phase differences of the near-field sound radiated from the first acoustic hole and the near-field sound radiated from the second acoustic hole at 1 kHz and the phase difference of the near-field sound radiated from the first acoustic hole and the near-field sound radiated from the second acoustic hole at 2 kHz is less than 30°.

7. The acoustic output device of claim 1, wherein the target frequency band includes target frequencies of 500 Hz, 1 kHz, 2 kHz, and 4 kHz.

8. The acoustic output device of claim 1, wherein a ratio of an area of the first acoustic hole to an area of the second acoustic hole is in a range of 0.5-2.

9. The acoustic output device of claim 8, wherein the ratio of the area of the first acoustic hole to the area of the second acoustic hole is in a range of 0.8-1.25.

10. The acoustic output device of claim 1, wherein the difference between the acoustic loads of the first acoustic hole and the second acoustic hole is less than 0.1.

11. The acoustic output device of claim 1, wherein a ratio of surface acoustic loads of the first acoustic hole and the second acoustic hole is in a range of 0.5-3.5.

12. The acoustic output device of claim 11, wherein the ratio of the surface acoustic loads of the first acoustic hole and the second acoustic hole is in a range of 0.8-2.

13. The acoustic output device of claim 1, wherein the at least one acoustic driver has a front side and a rear side defined by a diaphragm, the at least one acoustic driver radiates the sounds to the first cavity and the second cavity through the front side and the rear side respectively.

14. The acoustic output device of claim 1, wherein the at least one acoustic driver includes two acoustic drivers, the two acoustic drivers radiating the sounds to the first cavity and the second cavity respectively.

15. The acoustic output device of claim 1, wherein the acoustic output device further comprises:

a support structure configured to hang on a head or an upper torso of a user and configured to place the acoustic output device at a position on an ear of the user without blocking an ear canal.

16. An acoustic output device comprising:

at least one acoustic driver;

a first cavity and a second cavity acoustically coupled to opposite sides of the at least one acoustic driver, respectively, the first cavity being provided with a first acoustic hole, the second cavity being provided with a second acoustic hole, and the at least one acoustic driver radiating sounds with a phase difference to an outside environment through the first acoustic hole and the second acoustic hole, wherein within a target frequency band, the sound radiated by the acoustic output device to a far-field has directivity, which is manifested in that the sounds radiated from the first acoustic hole and the second acoustic hole have a far-field sound pressure level difference of not less than 3 dB in at least one pair of opposite directions, and a difference between acoustic loads of the first acoustic hole and the second acoustic hole is less than 0.15.

17. The acoustic output device of claim 16, wherein the target frequency band is 200 Hz-5000 Hz.

18. An acoustic output device comprising:

at least one acoustic driver;

a first cavity and a second cavity acoustically coupled to opposite sides of the at least one acoustic driver, respectively, the first cavity being provided with a first acoustic hole, the second cavity being provided with a second acoustic hole, and the at least one acoustic driver radiating sounds with a phase difference to an outside environment through the first acoustic hole and the second acoustic hole, wherein within a target frequency band, the sound radiated by the acoustic output device to a far-field has directivity, which is manifested in that the sounds radiated from the first acoustic hole and the second acoustic hole have a far-field sound pressure level difference of not less than 3 dB in at least one pair of opposite directions, and a ratio of surface acoustic loads of the first acoustic hole and the second acoustic hole is in a range of 0.5-3.5.

19. The acoustic output device of claim 18, wherein the target frequency band is 200 Hz-5000 Hz.

* * * * *